United States Patent [19]

Steeber

[11] Patent Number: 4,989,718
[45] Date of Patent: Feb. 5, 1991

[54] SURGE CONTROL METHOD AND APPARATUS

[75] Inventor: Dorian F. Steeber, Taylors, S.C.
[73] Assignee: Hartness International, Inc., Greenville, S.C.
[21] Appl. No.: 397,688
[22] Filed: Aug. 23, 1989
[51] Int. Cl.⁵ .............................. B65G 1/00
[52] U.S. Cl. .................................. 198/347.3
[58] Field of Search ........................... 198/347

[56] References Cited

U.S. PATENT DOCUMENTS

| | | | |
|---|---|---|---|
| 2,014,458 | 9/1935 | Winkley | 198/19 |
| 3,016,780 | 1/1962 | Mosen | 83/417 |
| 3,178,008 | 4/1965 | Solet | 198/43 |
| 3,340,992 | 9/1967 | Seragnoli | 198/347 |
| 3,470,996 | 10/1969 | Lee et al. | 198/24 |
| 3,499,555 | 3/1970 | Wahle | 214/16.4 |
| 3,762,582 | 10/1973 | Barnhart et al. | 198/347 X |
| 3,788,054 | 1/1974 | Haussmann et al. | 198/347 X |
| 4,018,325 | 4/1977 | Rejsa | 198/347 |
| 4,220,236 | 9/1980 | Blidung et al. | 198/347 |
| 4,273,234 | 6/1981 | Bourgeois | 198/347 |
| 4,499,987 | 3/1985 | Long | 198/347 |
| 4,560,057 | 12/1985 | Applegate et al. | 198/347 |

FOREIGN PATENT DOCUMENTS

| | | | |
|---|---|---|---|
| 1761019 | 5/1979 | Fed. Rep. of Germany | 198/347 |
| 2803320 | 8/1979 | Fed. Rep. of Germany | 198/347 |

Primary Examiner—H. Grant Skaggs
Assistant Examiner—James R. Bidwell
Attorney, Agent, or Firm—Dority & Manning

[57] ABSTRACT

Surge control apparatus and corresponding method are particularly adapted for the safe handling of highly crushable and/or tearable products, such as paper-based box type aseptic packages. A flow of products along a conveyor exiting an accumulator is held until previously released products have progressed a predetermined distance down the conveyor towards a subsequent workstation, such as a packer. If a product queue occurs within the accumulator, the upstream flow of packages is halted, and the queued products are shifted relatively slightly downstream against a movable locator mechanism. Such stopping and shifting isolates from production line pressures the packages to be removed from the conveyor. Through such isolation. adjacent package shear points are prevented as a vertically-oriented conveyor mechanism is used for removal and subsequent return of packages relative the conveyor. A movable transfer plate is manipulated in a position just lateral of the conveyor to facilitate alternate removal and return of packages relative thereto without tearing of package paper coverings. Maintenance of a predetermined downstream product gap facilitates placement of the locator mechanism. After a removal sequence, several non-removed packages are forced upstream into a pre-shifted position for being re-clamped by an outfeed brake, so that subsequent downstream shifting steps may take place for proper isolation of further queued-up products before their removal.

64 Claims, 6 Drawing Sheets

SURGE CONTROL METHOD AND APPARATUS

BACKGROUND OF THE INVENTION

The present invention in general concerns improved surge control apparatus and method, and more particularly concerns improved method and apparatus for providing surge control for easily damaged products being conveyed between two workstations.

Due to numerous considerations, it is desirable to establish production lines which run smoothly, and in general, without interruption. However, circumstances often cause undesired or unexpected variations in the operating speed of different components comprising a production line. In fact, various components may from time-to-time experience a total failure, i.e., stoppage, for either a relatively temporary period of time or for a more prolonged period of time.

Broadly speaking, the concept of surge control has heretofore been put forth, for example generally whereby the output of a relatively upstream production component is temporarily accumulated and subsequently fed to a downstream production line component. Such accumulation occurs primarily because the operating speed of the relatively upstream component overtakes that of the relatively downstream machine or workstation.

Various accumulators have been provided for use with a production line having a plurality of workstations or production areas. The following are examples of such accumulators:

| U.S. Pat. No. | INVENTOR(S) | DATE ISSUED |
| --- | --- | --- |
| 2,014,458 | Winkley | Sept. 17, 1935 |
| 3,016,780 | Mosen | Jan. 16, 1962 |
| 3,178,008 | Solet | Apr. 13, 1965 |
| 3,470,996 | Lee et al. | Oct. 7, 1969 |
| 3,499,555 | Wahle | Mar. 10, 1970 |
| 4,018,325 | Rejsa | Apr. 19, 1977 |
| 4,273,234 | Bourgeois | June 16, 1981 |
| 4,499,987 | Long | Feb. 19, 1985 |
| 4,560,057 | Applegate et al. | Dec. 24, 1985 |

One feature common to many prior art accumulators is the concept of a vertically-oriented conveyor or escalator-type mechanism, with plural, spaced flights thereon for the storage or accumulation of products between adjacent of such flights. Those of ordinary skill in the art will appreciate that indexing of such vertical mechanism in alternate directions results in either removal or return of products relative a conveyor belt with which the mechanism is associated.

Various differences in the foregoing exemplary accumulators may exist in the particular methodology or apparatus for handling the products to be accumulated. For example, Long (U.S. Pat. No. 4,499,987) generally operates a stop in association with incremental movement of an array of fingers to clear a slug of cartons, until one or more detectors indicate that there is no further need for accumulation of cartons by the device 10. A second detector is used for activating a stop whenever a space for insertion of such stop is detected between cartons passing by on a delivery belt. As further example, Applegate et al. (U.S. Pat. No. 4,560,057) uses a movable platform 50, or a diverting belt 62 or 132 for directing articles or packets from a main conveyor either into an empty compartment of a reservoir or into a secondary conveyor for subsequent transfer to or from a reservoir. A laterally moving plunger 52 is used in conjunction with the movable platform 50 for securing packets generally upside-down in an open or empty compartment 40a of reservoir 14. Without side plunger 52, the packets would fall back downward upon retraction of movable plunger 50. A second movable platform 56 is used during unloading of packets.

In general, if products on a production line being subjected to surge control are substantially durable and rigid, then their precise handling and treatment may not be as critical as in the case of less durable or less rigid products. As the products involved become less rigid and more fragile, a point is reached where use of prior art accumulator systems can result in damage and even literal destruction of the handled products.

One example of products which are subject to damage by either crushing or tearing are paper packages, such as 250 ml. size packages, as produced by Tetra Pak, Combibloc, or International Paper, Inc. Such packages are presently popular in such size, and others for the marketing of drink products, such as juices, and other beverages. The manufacture of such products typically may involve aseptic conditions, thus resulting in a particularized need for an accumulator capable of successfully handling such packages. Also, such packages generally have relatively sharp corners and edges, further contributing to handling difficulties.

Moreover, the need for a highly dependable, relatively large capacity accumulator, is particularly acute in connection with aseptic paper packages. For example, the paper used in a forming and/or filler machine for such types of products may be sterilized, such as by passing same of a heated bath of hydrogen peroxide. If such machine or production is stopped, the paper (which is generally coming from a large roll) may soften and possibly break upon restart. Also, a relatively lengthy (approximately 1 hour) resterilization process may be needed in the event problems occur during a stoppage of such production area. Thus, for such reasons, and due to required efficiencies of running a profitable operation, the filler machinery must operate on a more or less continuous basis, thus virtually requiring dependable, high volume surge control despite the added problem of the ready damage potential (through crushing or tearing) of the packages involved.

For numerous reasons, accumulator operations through manual intervention is not a viable alternative. For example, human handling of such particular products may itself result in accidental product damage (e.g., crushing) such as through storage in stacked layers, or through hurried handling. Moreover, intermittent human intervention can result in lack of necessary attention to other production line activities, and hurried, time-pressure activities of workers in and around production lines can (based on all circumstances of a given situation) create a significant risk of injury to the workers.

SUMMARY OF THE INVENTION

The present invention recognizes and addresses various of the foregoing problems, and others, concerning surge control or accumulator operations. Thus, broadly speaking, a principle object of this invention is improved surge control or accumulator operations. More particularly, a main object is improved method and apparatus for surge control operations pertaining to easily damaged products, such as aseptic paper packages.

Another generally object of this invention is reduced human handling of packages, particularly in connection with surge control operations, thereby resulting in reduced package damages and better quality production, with reduced risk of injury to the workers. Still another present object is improved automated accumulator devices for dependable and high volume surge control handling of even readily damaged packages, to thereby permit production workers to more regularly perform their primary duties relating to the production line.

Yet another more particular object of the present invention is to provide improved method and apparatus which facilitates successful accumulator handling of aseptic paper packages, without crushing thereof, or without tearing paper coverings thereof. More specifically, it is a present object to at least minimize and to eliminate (if possible) shear points during handling of such products, and to isolate such products from production line pressures during their removal and/or return relative a production line conveyor.

It is a still further object of the present invention to provide such improved accumulator apparatus having a "flow-through" design, so as not to adversely affect the production line with which it is associated should the accumulator fail.

Additional objects and advantages of the invention are set forth, or will be apparent to those of ordinary skill in the art, from the detailed description which follows. Also, it should be appreciated that modifications and variations as to the specific illustrated and discussed features and steps hereof may be practiced in various embodiments, uses, and methodologies of this invention without departing from the spirit and scope thereof, by virtue of present reference thereto. Such variations may include, but are not limited to, substitution of equivalent means, features, or steps for those shown or discussed, and the reversal of various parts, steps, or the like.

Still further, it is to be understood that different embodiments, as well as different presently preferred embodiments or methodologies, of the present invention may include various combinations of presently disclosed features, steps, or their equivalents (including combinations not expressly shown or stated). One exemplary such embodiment of the present invention relates to a method of surge control for products being transported via a moving conveyor belt means between two production areas. Such exemplary method may comprise providing an accumulator device alongside the conveyor belt means intermediate the two production areas so that one of such areas is upstream of the accumulator device and the other production area is downstream of such device, such device being capable of controllably removing products from the conveyor belt means if there is a back-up of products being fed to the downstream production area; selectively holding back products emerging from the downstream end of the accumulator device so as to maintain a predetermined distance gap between adjacent products moving towards the downstream production area; and controllably removing products from the conveyor belt means with the accumulator device if a predetermined queue of products develops within the accumulator device before the predetermined distance gap occurs between products emerging from the accumulator device.

Another present exemplary embodiment concerns a method of operating an accumulator device generally of the type having a vertically-oriented conveyor with a plurality of spaced, outwardly extending veins for accumulating products therebetween, with indexing of such conveyor in selected directions resulting alternatively in removal or return of products relative a carrying surface of a production line. Such method preferably includes positioning the accumulator device adjacent a production line of products such that given extending veins may be situated in a null position for the passage of products therethrough with such veins acting as guide rails; providing a movable transfer plate generally opposite the distal edges of the extending veins in the vicinity of the production line, and having a transfer edge situated generally laterally from the carrying surface of the production line; and alternately lowering the transfer edge beneath the production line carrying surface whenever indexing the vertically-oriented conveyor for removing products from the production line, and raising the transfer edge above the production line carrying surface whenever indexing the vertically-oriented conveyor for returning products to the production line. With such method, edges of the products being handled on the production line are protected from damage due to operation of the accumulator device.

Yet another present exemplary methodology comprises a method of controlling the flow of products advancing along a conveyor from a first workstation to a second workstation, including the temporary accumulation off-line of excessive numbers of such products queued up between the two workstations. Such exemplary method may include providing an apparatus adjacent the conveyor between the two workstations, and having accumulator means for selectively alternately removing and returning groups of products relative such conveyor, such apparatus having an infeed side receiving products from the first workstation upstream therefrom, and an outfeed side from which products emerge on their way to the second workstation downstream therefrom, such accumulator means being situated generally between such infeed and outfeed sides. The method may further include preventing products from leaving the apparatus outfeed side until products previously released therefrom have passed a sensing point along the conveyor a predetermined distance downstream towards the second workstation from the apparatus, so as to maintain a predetermined gap between products emerging from the apparatus outfeed side; and initiating a product removal sequence if the preventing step results in a queue of products extending through the apparatus from the outfeed side thereof back to the infeed side thereof.

In the foregoing exemplary method, such product removal sequence may preferably include stopping the flow of further products into the apparatus infeed side; relatively shifting slightly downstream the products within the apparatus queue; and thereafter operating the accumulator means for removing products from the conveyor within the apparatus, whereby such products are isolated from line pressure along the conveyor by such stopping and shifting steps, to prevent shear point damage thereto during their removal.

With respect to present apparatus, one present exemplary embodiment concerns apparatus for surge control of products being transported via a moving conveyor belt means between two production areas. Such exemplary apparatus may comprise accumulator means for being positioned alongside a conveyor belt means intermediate two production areas so as to be upstream and downstream respectively of such areas, such accumulator means controllably removing products from the conveyor belt means, and having a relative infeed side and outfeed side. The apparatus may further include outfeed brake means, associated with the accumulator means outfeed side, for controllably holding back products emerging from the accumulator device outfeed side; and further include control means, operatively associated with the accumulator means and the outfeed brake means, respectively, for actuating the outfeed brake means to hold back products emerging from the accumulator means so as to maintain a predetermined distance gap between adjacent products moving towards the downstream production area, and for controlling the accumulator means to remove products from the conveyor belt means if a predetermined queue of products develops within the accumulator means before the outfeed brake means is de-actuated.

Another present exemplary embodiment concerns an improved accumulator device of the type having a vertically-oriented conveyor with a plurality of spaced, outwardly extending veins for accumulating products therebetween, with indexing of such conveyor in selected directions resulting alternatively in removal or return of products relative a carrying surface of a production line with which such accumulator device is associated in such fashion that given of the extending veins may be situated in a null position for the passage of products therethrough carried on the conveyor with such veins acting as guide rails. Such improved accumulator device includes a movable transfer plate generally opposite the distal edges of the extending veins in the vicinity of the production line, and having a transfer edge situated generally laterally from the carrying surface of the production line; and means for controllably moving the movable transfer plate so as to lower the transfer edge thereof beneath the production line carrying surface whenever the conveyor is being indexed for the removal of products from the production line, and so as to raise the transfer edge above the production line carrying surface whenever the conveyor is being indexed for the return of products to the production line, whereby edges of products being handled on the production line are protected from damage due to operation of the vertically-oriented conveyor.

Yet another construction comprising an exemplary embodiment includes product handling apparatus for controlling the flow of products advancing along a conveyor from a first workstation to a second workstation, such apparatus including: accumulator means, adjacent the conveyor between the first and second workstations, for controllably alternately removing and returning products relative the conveyor, such accumulator means having respective infeed and outfeed sides generally between which products may be removed from the conveyor; infeed brake means, associated with the accumulator means infeed side, for being controllably actuated for stopping the entry of products along the conveyor into the accumulator means infeed side; outfeed brake means, associated with the accumulator means outfeed side, for being controllably actuated for stopping products along the conveyor from emerging from the accumulator means outfeed side; downstream sensor means, situated alongside the conveyor a predetermined distance downstream from the accumulator means outfeed side, for detecting the passage of products thereby; and control means operatively associated with the accumulator means, infeed brake means, outfeed brake means, and downstream sensor means, respectively, for temporarily accumulating products offline of the conveyor whenever excessive numbers of products queue up between the first and second workstations.

With the foregoing construction, preferably the control means operates in a normal run mode to alternately actuate and de-actuate the outfeed brake means for preventing products from leaving the accumulator means outfeed side until a predetermined number of previously released products have passed the sensor means, and operates in a product removal mode whenever actuation of the outfeed brake means in the normal run mode results in a queue of products extending through the accumulator means from the outfeed side thereof back to the infeed side thereof. Such product removal mode preferably includes actuating the infeed brake means to stop upstream products on the conveyor from entering the accumulator means indeed side, de-actuating the outfeed brake means to permit relative downstream shifting of products on the conveyor within the accumulator means, and controlling the accumulator means for removing such products from the conveyor.

Still a further present exemplary construction relates to an accumulator for use with packages moving between workstations, such as situated along a conveyor belt moving from a filler machine towards a straw-applicator or packing machine, such accumulator comprising: respective infeed and outfeed ends situated upstream and downstream, respectively, relative the moving conveyor belt; a vertically-oriented escalator-type mechanism situated substantially over the conveyor belt, and located generally between the accumulator infeed and outfeed ends, such mechanism having a controllably movable conveyor belt with plural, spaced flights thereon for selectively removing packages from the conveyor belt and returning packages thereto; an infeed brake associated with the infeed end for controllably stopping the flow of packages along the conveyor belt into the accumulator; an outfeed brake associated with the outfeed end for controllably stopping the flow of packages along the conveyor belt from the accumulator; infeed sensor means for detecting the presence of packages at the accumulator infeed end; outfeed sensor means for detecting the presence of packages at the accumulator outfeed end; downstream sensor means for detecting the presence of packages on the conveyor belt at a predetermined distance downstream from the accumulator outfeed end; a controllably movable locator member, situated at a point relatively just downstream from the outfeed brake and the accumulator outfeed end, for selectively interrupting the flow of packages along the conveyor belt at such point; a back-up mechanism, situated at such point relatively just downstream from the outfeed brake for selectively forcing packages at least slightly back upstream against the conveyor belt so as to be stopped thereat by the outfeed brake; and accumulator control means, responsive to the infeed, outfeed, and downstream sensor means, and controlling the escalator-type mechanism, the infeed and outfeed brakes, the locator member, and the back-up mechanism, for selectively removing and returning packages relative the conveyor belt without damage to such packages, so that queued up packages are first isolated from production line pressure and thereafter temporarily accumulated on the escalator-type mechanism for subsequent reinsertion onto the production line.

Those of ordinary skill in the art will better appreciate the features and aspects of such embodiments, methodologies, and others, upon review of the remainder of this specification.

BRIEF DESCRIPTION OF THE DRAWINGS

A full and enabling disclosure of the present invention, including the best mode thereof, directed to one of ordinary skill in the art, is set forth in this specification, which makes reference to the appended figures, in which.

Figure 1:
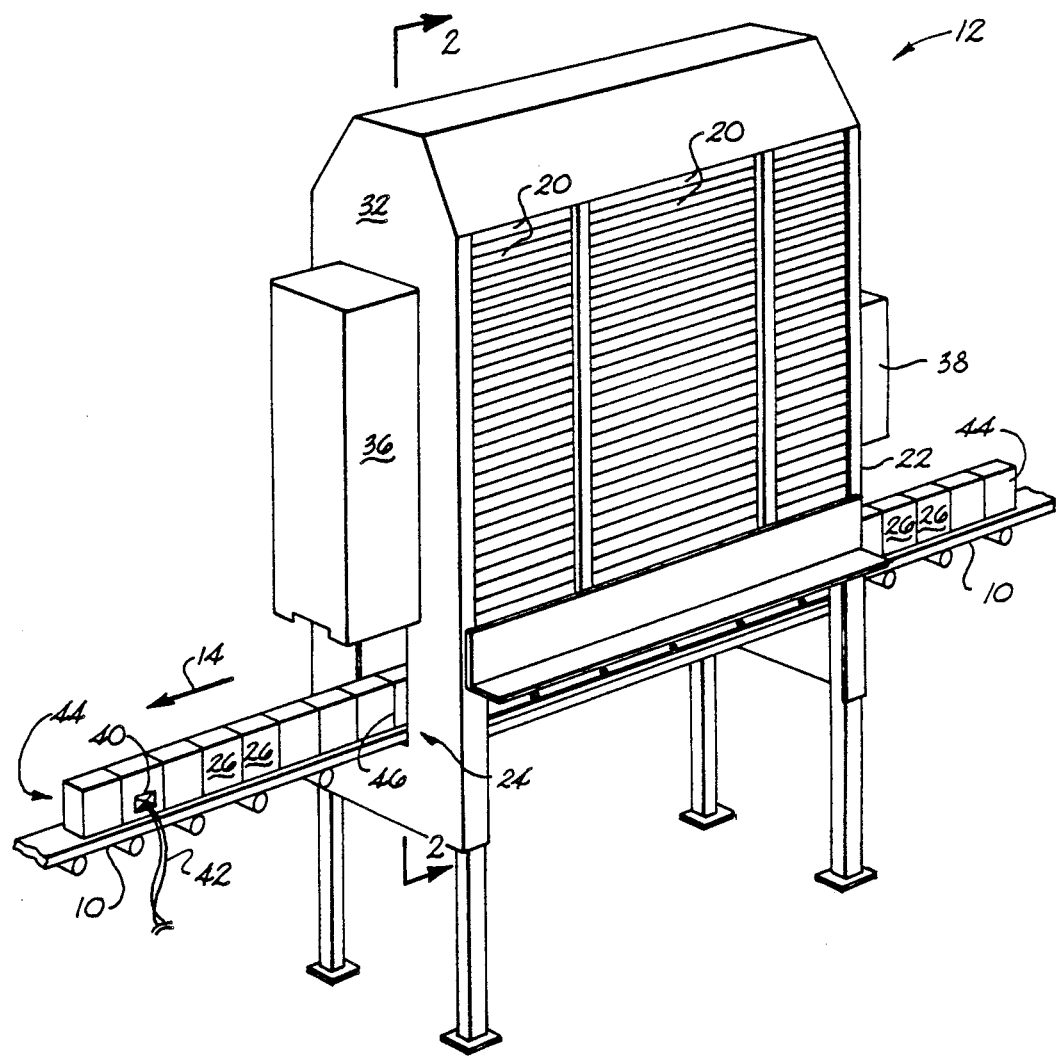
FIG. 1 is a generally side, isometric view of an exemplary embodiment of the present invention situated relative an existing production line or conveyor belt means with which the present invention may be practiced.

Repeat use of reference characters throughout the present specification and appended drawings is intended to represent same or analogous features, elements, or aspects of the invention.

DETAILED DESCRIPTION OF THE PREFERRED EMBODIMENTS

Those of ordinary skill in the art will appreciate that numerous variations and modifications may be made to the exemplary embodiments discussed and illustrated (or suggested) herewith, as well as associated methodologies, without departing from the spirit and scope of this invention. For example, this invention may be practiced with numerous different types and shapes of packages, though preferred embodiments are specifically adapted for use with aseptic paper packages such as produced by Tetra Pak, Combibloc, or International Paper, Inc., in the 250 ml. size, or similar.

FIG. 1 is an isometric, generally side view of an apparatus for practicing the present invention in association with, for example, a pre-existing production line or conveyor belt means 10. Preferably, such pre-existing conveyor means is entrained through or otherwise associated with accumulator apparatus 12 of the present invention, so that no separate or independent conveyor mechanism need be provided with apparatus 12. While, of course, a separate drive mechanism could be practiced, the illustrated arrangement is preferred since it permits a "flow-through" design, so that failure or malfunction of apparatus 12 in no way otherwise affects the operation of production line 10, which is generally operatively flowing in the direction of arrow 14.

Figure 2:
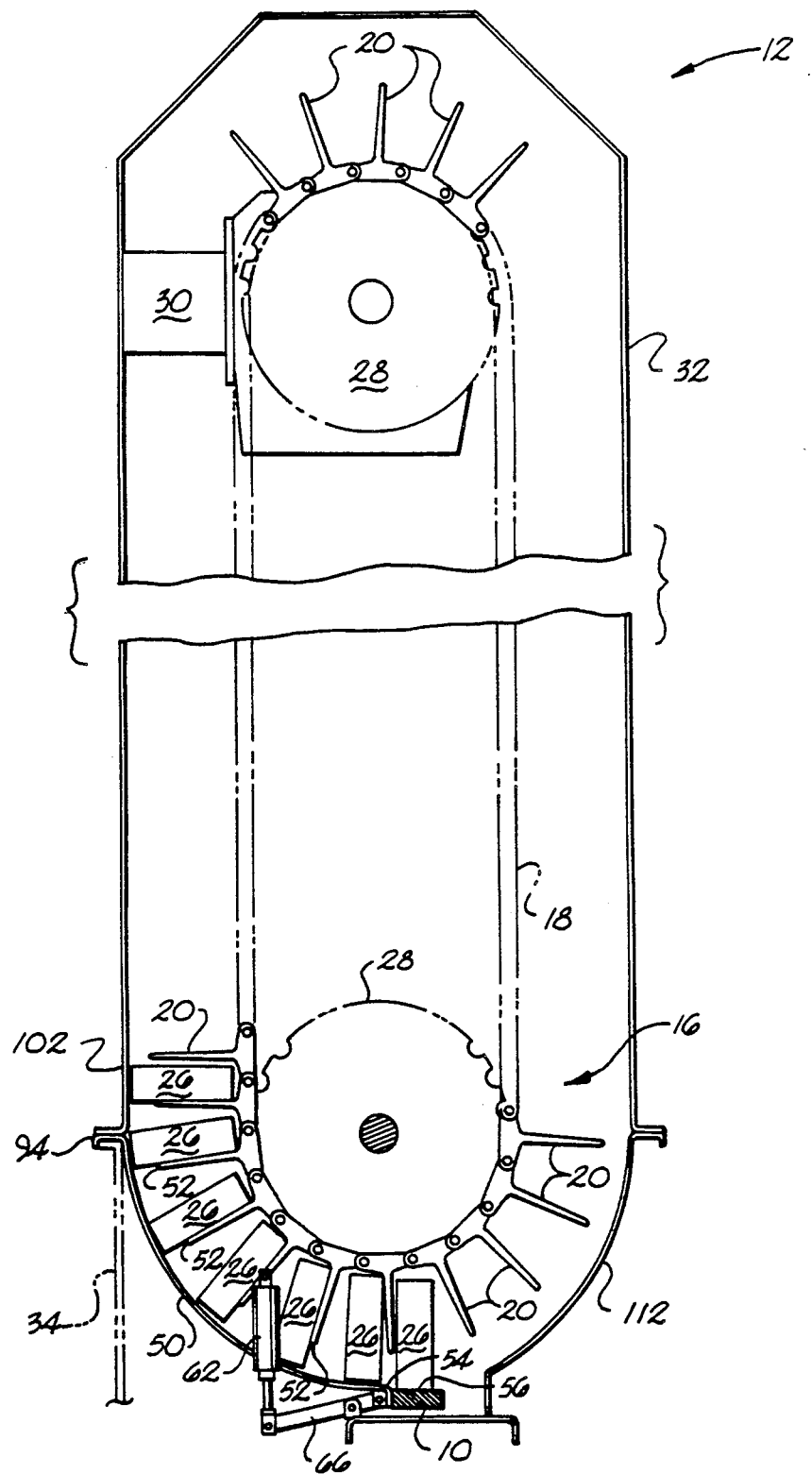
FIG. 2 is a cross-sectional view of the exemplary apparatus of present FIG. 1, taken along the sectional line 2—2 indicated therein.

In the following brief initial overview of the present structure, reference will be made to FIGS. 1 and 2 collectively, since FIG. 2 is a cross-sectional view of the FIG. 1 embodiment, taken along a vertical axis thereof, as represented by sectional line 2—2 in such present FIG. 1. Accumulator apparatus 12 includes an accumulator means, which may comprise a generally vertically-oriented conveyor mechanism 16, which may in turn include a chain or belt 18 with a plurality of spaced, outwardly extending veins or flights 20 thereon. As best illustrated in FIG. 1, such flights 20 preferably extend generally from about an infeed end 22 of apparatus 12 to about an outfeed end 24 thereof. As indicated by FIG. 2, individual packages 26 may be entrained between a pair of adjacent flights 20, and accumulated therein through indexing of vertical conveyor mechanism 16. Such indexing may be variously accomplished, such as with a pair of toothed drive wheels 28, or the like, selectively driven by a controlled electric motor 30 or its equivalents, as well understood by those of ordinary skill in the art.

In essence, vertical conveyor mechanism 16, such as including components 18, 20, 28, and 30, is a structural component well known to those of ordinary skill in the art, as generally exemplified by the prior art references discussed above in the Background portion of this specification. Likewise, those of ordinary skill in the art will appreciate that indexing of drive wheels 28 results in sweeping of flights 20 over the conveyor belt means 10 with which apparatus 12 is associated. Depending on the direction of indexing, and the presence or absence of packages 26, such packages may either be removed from, or returned to, conveyor 10.

For safety reasons, as well as aesthetic reasons, apparatus 12 may be variously encased in a housing 32, variously having sidewalls, end walls, and the like. Some walls may be transparent, so as to permit inspection of accumulated products, as represented by the visualized flights 20 in present FIG. 1. Some walls may comprise removable panels, such as 34, removal of which facilitates maintenance of the apparatus. For clarity and simplicity, such panel 34 and a corresponding opposite side panel are not shown in solid line in present FIGS. 1 and 2.

A further housing 36 may preferably be provided externally to housing 32, and may receive and protect other features of present constructions, such as a movable locator means, as discussed hereinafter primarily with reference to FIGS. 5 and 6. Similarly, a housing 38 may be provided generally external to housing 32, such as for safe receipt and support of control means for use with the present invention. Such control means may variously comprise electronic circuits, manifested either in hardware, software, or various combinations thereof, for receiving sensor inputs and controlling controllable members in accordance with the present invention, as hereinafter described. Those of ordinary skill in the art will appreciate that such control means may assume numerous forms so long as feedback or sensor signals are operated on as discussed hereinafter, and so long as controllable members or means are controllably actuated and de-actuated as also described below. Hence, a specific discussion of the hardware (or software) of such a control means or mechanism is not necessary for an adequate and enabling understanding of the present invention. Likewise, in order to more clearly illustrate the present structure and methodology, control lines for interconnecting required power lines, feedback or sensor lines, and control signal lines, are not explicitly illustrated in the figures though well understood by those of ordinary skill in the art.

Preferably, during operation of apparatus in accordance with the present invention, a predetermined distance gap is maintained between the outfeed end 24 of apparatus 12 and a point downstream therefrom, such as associated with a downstream sensor means 40. Feedback lines 42 from such sensor means are operatively associated with control means within housing 38, or its equivalents, for ultimately affecting operation of apparatus 12, as discussed hereinbelow primarily with reference to FIGS. 5 and 6. Such operation as described below beneficially results in longitudinal isolation of a slug of packages from production line pressure, to permit removal of such slug (i.e., grouping) of packages without significant shear point pressure between adjacent such packages.

For example, present FIG. 1 illustrates a line 44 of packages 26, which are riding on conveyor belt means 10, and which are entering infeed end 22 of apparatus 12 and emerging from outfeed end 24 thereof. Practice of the present invention preferably results in maintenance of a gap between emerging products between outfeed end 24 and sensor means 40. Thus, the illustration of present FIG. 1 represents a generally uncontrolled or "flow-through" condition along conveyor belt means 10. In such condition, packages 26 are continually and contiguously aligned throughout apparatus 12 on that portion thereof within or closely associated with conveyor belt means 10 (such exact condition is shielded from view in the isometric illustration of present FIG. 1). With such condition, there is a significant amount of production line pressure all along line 44, which pressure can result in crushing (partial or otherwise) of packages 26 as a filler machine or other upstream production area continues to add packages 26 to production line 10.

Without isolation of packages 26 between infeed end 22 and outfeed end 24, operation of mechanism 16 (so as to sweep packages 26 from conveyor belt means 10 using paddles or flights 20) would result in a package shear point, such as at point 46. A similar shear point would exist adjacent to infeed end 22. As discussed below, practice of the present invention prevents any significant shear points between longitudinally adjacent packages, thereby making possible safe and efficient handling of even highly crushable packages, such as the aseptic paper packaging discussed above. Exemplary structure and methodology for practice of the present invention is discussed in greater detail, below.

One other aspect of the present invention represented in present FIGS. 1 and 2 is that certain of the flights 20 are situated in a "null" position, for unaffected passage of products therethrough. Means for establishing such position, whether manually or automatically, may comprise a hand crank or the above-discussed control means, so that any adverse affects to production line 10 may be neutralized by placing flights 20 in such null position in the event of a failure or malfunction of apparatus 12. Thereafter, necessary maintenance could be performed generally with production line 10 operating just as if apparatus 12 were not present.

Figure 3:
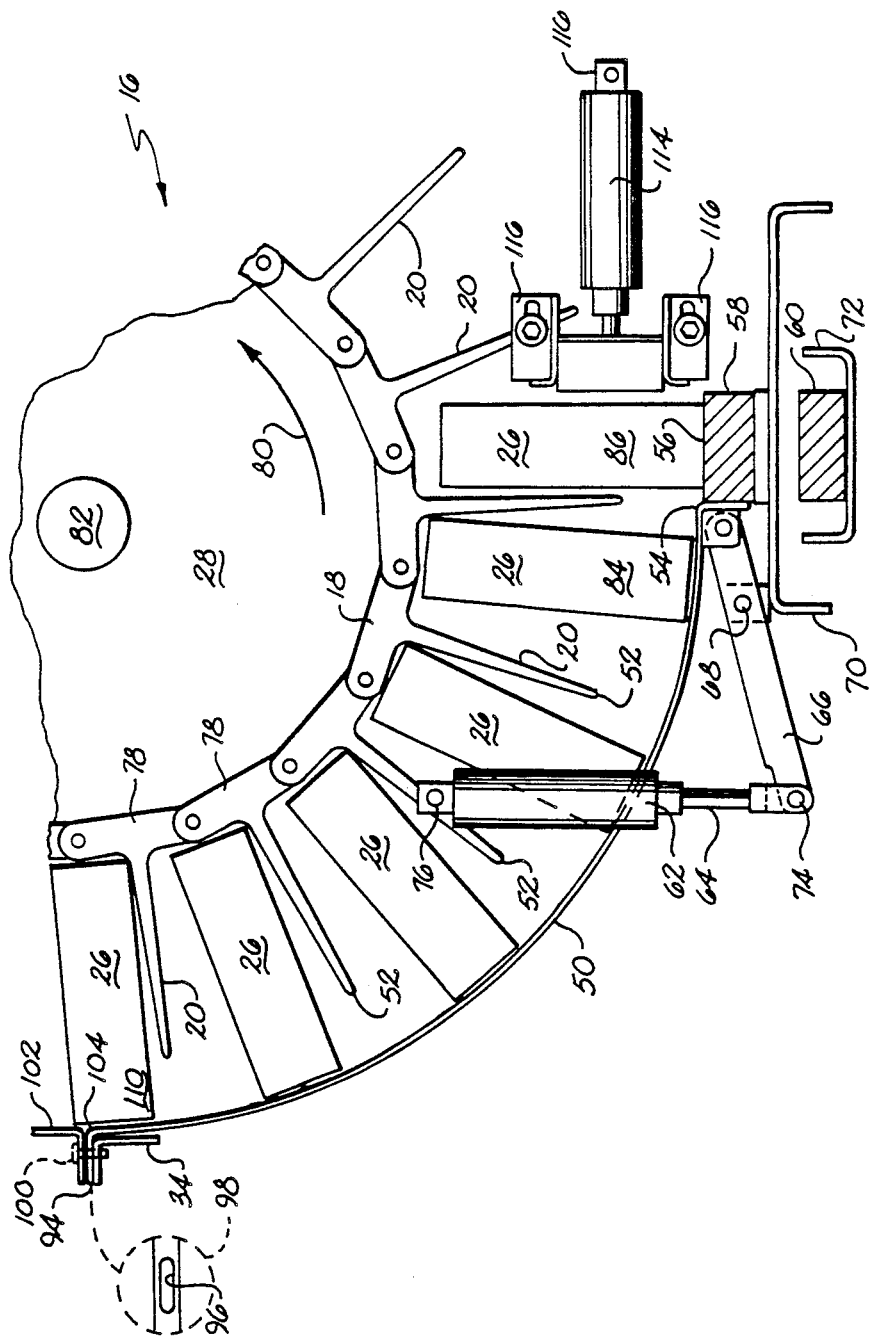
FIG. 3 is an enlarged, partial view of a portion of the exemplary embodiment shown in FIG. 2, also illustrating certain aspects of present methodologies for practicing this invention.
Figure 4:
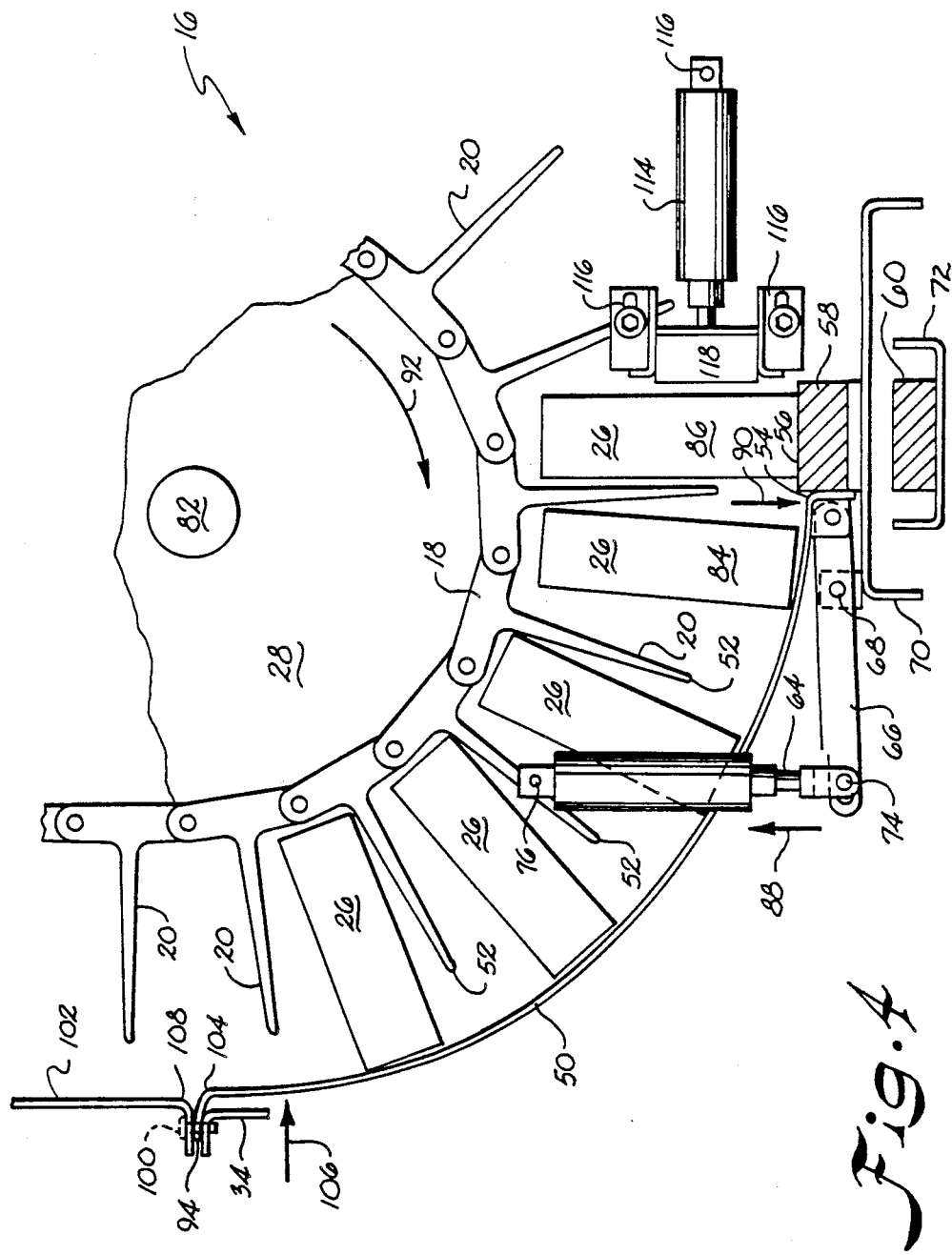
FIG. 4 is another enlarged partial view similar to that of FIG. 3, illustrating still further aspects of the present methodologies.

Present FIGS. 2 through 4 more fully illustrate other features of the present invention which contribute to elimination or minimization of package shear points, particularly in the lateral direction (rather than longitudinal, as referenced above) of conveyor belt means 10. FIGS. 3 and 4 illustrate an enlarged, partial view of the lower portion of mechanism 16, and other aspects of this invention. As illustrated in FIGS. 2 through 4, a transfer plate 50 is illustrated in side cross-sectional view. Such transfer plate is situated generally opposite the distal ends 52 of the plurality of outwardly extending flights, at least generally in the vicinity of production line 10. Also, significantly, a transfer edge 54 of such transfer plate is situated generally laterally from the upper-most carrying surface 56 of belt 10. The topmost run 58 as well as the return run 60 of belt means 10 is represented in present FIGS. 3 and 4.

Transfer plate 50 is preferably movable, and is associated with means for controlling movement thereof, such as are preferably embodied with a pair of air cylinders 62 associated with each longitudinal end of plate 50 (which extends essentially the length of flights 20 along conveyor belt 10, as represented in FIG. 1). As understood by those of ordinary skill in the art upon comparing present FIGS. 3 and 4, controlled movement of piston 64 (and the non-illustrated second air cylinder, if used) results in manipulation of transfer edge 54, as a result of pivoting of member 66 about fixed axis point 68 supported relative some fixed housing portion 70 of apparatus 12. Such housing portion may be associated with, or independent of, the protective covering 72 which is representatively shown around the lower or return run 60 of belt means 10. Member 66 pivotably interconnects with piston 64 at connection point 74, while the opposite end 76 of air cylinder 62 is also received in a fixed relationship with the housing of apparatus 12.

The resulting movement of movable transfer plate 50, regardless of how it is controllably effected in accordance with the present invention, is to alternately raise and lower transfer edge 54 relative carrying surface 56 of conveyor belt means 10. As should be apparent to those of ordinary skill in the art, the relatively raised position of transfer edge 54 as represented in present FIG. 3 is desired whenever conveyor 18 (illustrated with multiple chain drive links 78) is to be rotated counterclockwise (the direction of arrow 80) about central axis 82 thereof. With rotation of drive member 28 in a counterclockwise direction, the distal ends 52 of outwardly extending members 20 are likewise rotated in a counterclockwise sense so that with a proper "index" of drive wheel 28, a line or slug of packages may be moved from the position occupied by exemplary package 84 to that of exemplary package 86. Such action amounts to returning a grouping or slug of products to conveyor belt means 10.

Whenever piston 64 of air cylinder 62 is retracted (i.e., moved in the direction of arrow 88 of FIG. 4), transfer edge 54 is moved relatively downward in the direction of arrow 90 of such FIG. 4. As is apparent from the illustration of such FIG. 4, transfer edge 54 is thereby lowered to a point beneath carrying surface 56 of conveyor belt means 10, so that a lateral shear point along such transfer edge is prevented for packages being removed from such carrying surface. In other words, as axis 82 is driven in a clockwise direction (direction of arrow 92), an exemplary package in the position of package 86 is swept into a removed position as represented by package 84. As should be apparent to those of ordinary skill in the art, movement of a line of packages from either a position on conveyor belt means 10 to a position off of such belt, or vice versa, involves engagement of such row of packages with the full length of the involved flights 20 from infeed end 22 to outfeed end 24 thereof. For the sake of clarity, such actual engagement is not explicitly illustrated in each of present FIGS. 3 and 4, though representative engagement is variously shown in all of present FIGS. 2 through 4.

Preferably, controlled movement of transfer plate 50 is, as needed, automatically effected responsive to either removal or return of products relative conveyor belt means 10, thereby advantageously reducing the accomplishment of lateral edge safety for such packages to issuance of a command signal to properly position movable transfer plate 50 before each removing or returning sequence to be actuated through appropriate rotation of drive mechanism 28.

Another advantageous aspect of the present invention resides in the limited flexible nature of movable transfer plate 50, which preferably may be formed of a moderate gauge sheet metal or the like. A secondary edge 94 is defined on a edge of transfer plate 50 opposite that of transfer edge 54 thereof. Due to the limited flexibility, movable nature of transfer plate 50, actuation of air cylinder 62 (or other equivalent means for moving plate 50) results in an advantageous movement of edge 94. In this instance, limited flexibility may be thought of as a degree of rigidity adequate such that manipulation of transfer edge 54 of plate 50 results in a degree of movement at secondary edge 94 thereof.

In particular, such secondary edge 94 is provided with an elongated opening 96, as represented by the encircled, top view of such member in bubble 98 of present FIG. 3. A simple bolt 100 or the like may be used to secure housing members 34 and 102 of housing 32, with openings therein of a size corresponding with that of bolt 100 (preferably only slightly larger) being formed in each of members 34 and 102. By having a slotted opening 96, transfer plate 50 is either slightly pulled out relative the position of bolt 100 or pushed backward thereto, such that a further edge 104 thereof is manipulated alternately in the direction of, and opposite the direction of, arrow 106. Bolt 100 in effect guides movement of plate 50 in the vicinity of edge 94 thereof. Whenever air cylinder(s) 62 is actuated for movement of transfer edge 54 downwardly, to permit removal of packages from conveyor means 10, edge 104 is moved in the direction of arrow 106, and thus projects beyond adjacent edge 108 of member 102. Such slight projection again prevents the occurrence of a lateral shear point which could otherwise occur at the juncture between members 34 and 102 if the "live edge" effect of transfer plate 50 were not provided. As should be apparent to those of ordinary skill in the art, edge 104 is pushed by the limited rigidity (i.e., limited flexibility) of transfer plate 50 back towards bolt 100 (opposite the direction of arrow 106) whenever air cylinder piston 64 is extended, as is illustrated in present FIG. 3. As is so illustrated, such movement renders an arrangement which makes possible passage of a row of packages 110 beyond such edge 104 without danger of shearing or tearing of such packages.

Since aseptic paper packages by Tetra Pak, or similar, are covered with paper wrappers or the like, the movable transfer plate features of the present invention greatly facilitate surge control handling of such particular types of packages, by eliminating lateral shear points for such packages which could otherwise occur as an accumulator means operates.

FIG. 2 also representatively illustrates a further curved plate 112, which may be placed generally on the opposite side of apparatus 12 from movable transfer plate 50, so as to also oppose the distal ends of flights 20 for retaining products within such flights whenever they are in the inverted position as occurs to varying degrees whenever they are in the vicinity of conveyor belt means 10. If removal and return of packages is performed from only one side of conveyor belt means 10, then plate 112 may situated in a more or less fixed condition. However, in accordance with the present invention, plate 112 may be rendered movable and controllable in the manner described above with reference to movable transfer plate 50 if it is desired to permit removal and return of packages from either lateral side of conveyor belt means 10, details of which alternative embodiment should be understood and appreciated by those of ordinary skill in the art from the foregoing description.

As also representatively illustrated in present FIGS. 3 and 4, a further air cylinder 114, or equivalent means may be fixed relative to apparatus 12, such as at plural points 116, so that operation of such air cylinder actuates movement of stop block 118. When properly actuated, such stop mechanism 118 comprises an outfeed stop means or outfeed brake for selectively engaging and holding packages 26 as they are about to emerge from the outfeed end of apparatus 12. Various opposing members (not explicitly illustrated) may be used for permitting block 118 to trap a given package thereagainst. It is to be understood by those of ordinary skill in the art that the placement of such controllable outfeed brake means may be varied, generally so long as its position does not adversely effect operation of flights 20. For example, a position just downstream from the outfeed end of flights 20 would avoid undesired interaction or interference with the accumulator means.

Another aspect of the present invention which should be apparent to those of ordinary skill in the art from the present disclosure and illustrations is that conveyor belt means 10 is preferably continuously moving whenever the associated production line is operative. Thus, without requiring an independent drive, stop operations of an outfeed brake means results in the continued movement of carrying surface 56 beneath a line of packages 86. Thus, controlled actuation and de-actuation of such a brake mechanism, in combination with more or less continuous operation of conveyor belt means 10, provides a controllable means for advancing packages relative apparatus 12. Such is equally true, regardless of the relative position of a given break means, either upstream or downstream at some point along apparatus 12.

Now referring to present FIGS. 5 and 6, additional aspects of the present invention, including concerning both method and apparatus thereof, are explained as follows. FIG. 5 illustrates in substantially diagrammatical form, a side plan view of a lower portion of in exemplary apparatus 12 in accordance with the present invention, and in accordance with which the present methodology may be practiced. FIG. 6 illustrates in generally side (partially cut-away) plan view, exemplary locator means and back-up means for practicing certain aspects of the present invention.

Figure 5:
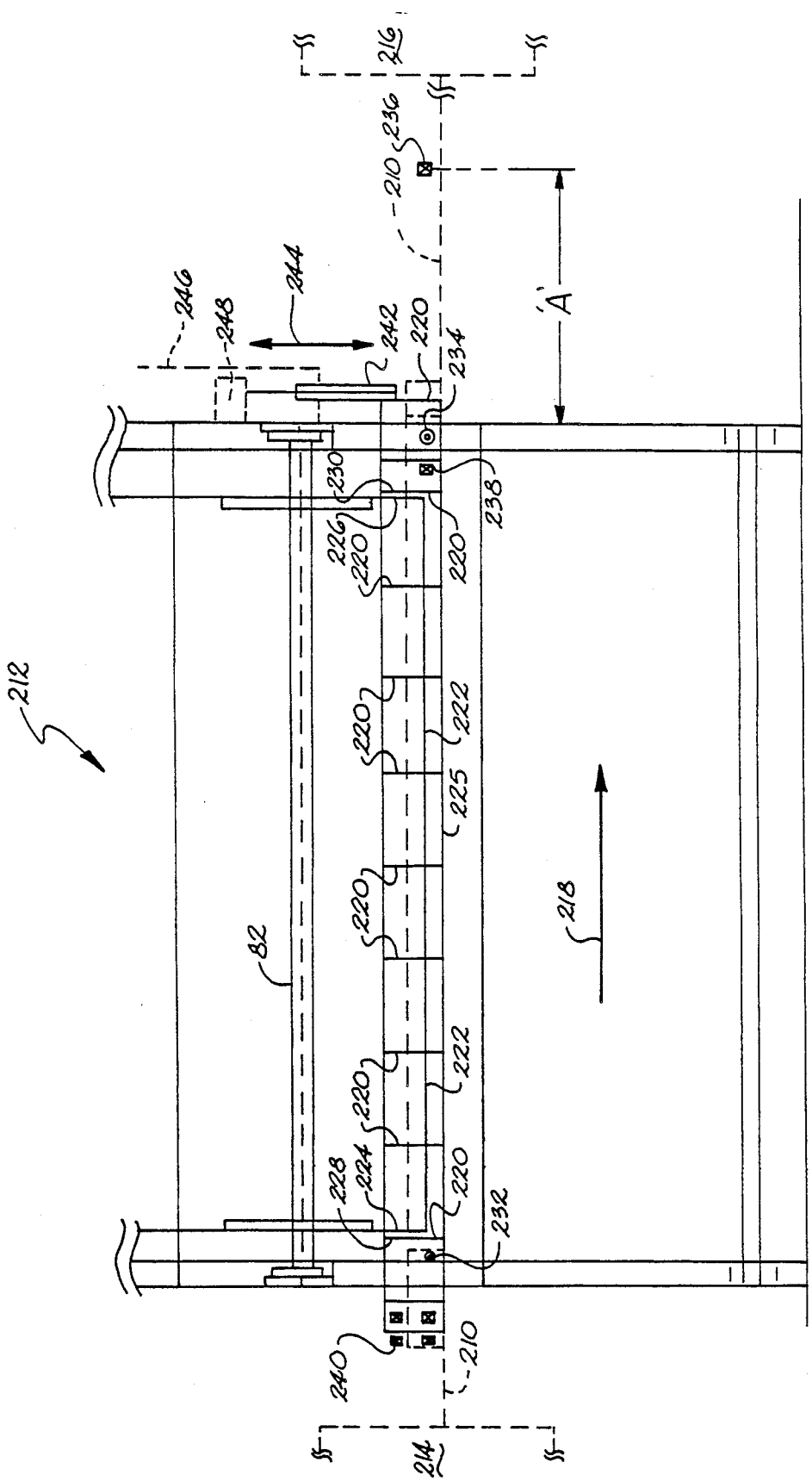
FIG. 5 is a partial, side elevational view, in generally diagrammatical form, for illustrating both exemplary present apparatus and methodology.

In FIG. 5, an exemplary accumulator device 212 is situated alongside a conveyor belt means 210, intermediate to separate production areas 214 and 216. The essential production line flow is in the direction of arrow 218; hence, production area or workstation 214 is generally upstream from apparatus 212, while workstation or production area 216 is generally downstream therefrom. Workstation 214 may comprise a filler machine or the like, for filling the subject packages with fruit juices or other beverages. The filler machine normally also closes, or seals, the individual packages, which thereafter move relatively downstream along production line 210 towards a straw-applicator or a packing machine, as represented by workstation 216. Workstations 214 and 216 may represent other types of machines or stages in production, just as this invention may be practiced with other types of products. Since products of this particular nature are most frequently packed in cellophane by groups of three turned end-to-end, the solid lines 220 are intended to represent groupings of three individual packages (i.e., a predetermined number of such products). Those of ordinary skill in the art will appreciate that such packages, while preferably thought of in terms of groups of three, are still actually individual packages within apparatus 212. Also, other groupings of other predetermined numbers of products may be practiced.

Still in diagrammatic form, drive axis 82 has extending therefrom along the length of apparatus 212 the distal edge 222 of a given flight or vein 225 of an accumulator means, of the type having a vertically-oriented conveyor, as discussed generally above with the reference to mechanism 16. Infeed end edge 224 and outfeed end edge 226 of such vein avoid shear point contacts with the products because there is no overlap with the smaller portion of partial packages which are not to be taken into or accumulated between an adjacent set of such veins during a given product removal sequence. In other words, the line of products illustrated between points 228 and 230 are to be taken up into the accumulator means, and as is apparent with the relationship of respective point pairs 224/228 and 226/230, there will be no longitudinally adjacent package shear point interference.

Brake means for both the infeed and outfeed ends of the apparatus 212 may be provided, such as the air cylinder mechanism 114 discussed above. The operative location of such infeed brake means is represented by member 232, while member 234 represents the operative position of outfeed brake means. Control of such respective brake means is effected in accordance with the present invention, as discussed hereinafter.

Downstream sensor means 236 may comprise a photoelectric cell, proximity detector, or virtually any other type of mechanism for reliably indicating the presence or absence of packages or other forms of products thereat, or passing thereby. As represented in present FIG. 5 downstream sensor means 236 is located a predetermined distance "A" downstream from the outfeed end of apparatus 212. While the absolute or actual length of such gap is not ordinarily critical, it is a preferred aspect of this invention that at least a predetermined gap be maintained between a predetermined number of products (e.g., 1, 3, or other numbers) emerging from the outfeed end of apparatus 212. Maintenance of such a gap yields up advantages as discussed below in connection with the present surge control methodology, and apparatus for practicing same. Furthermore, those of ordinary skill in the art will appreciate that such surge control aspects of the present invention may be applied to various groupings of a particular number of products, as well as individual products. In other words, the desired gap "A" may be maintained as to groups of three packages being released at a time collectively from the outfeed end of apparatus 212, rather than as between each individual pair of packages to be released therefrom. Groupings of three are particularly preferred, as referenced above, since the downstream packer units will typically operate on the individual packages in groups of three.

Additional sensor means are representatively illustrated, such as the outfeed sensor means 238, and the infeed sensor means 240. Each of the respective means may comprise different forms of sensing mechanisms, mechanical, electrical, electrical-mechanical, or otherwise, as broadly referenced above. However, as diagrammatically represented in present FIG. 5, infeed sensor means 240 may preferably comprise a bank of four separate sensing elements, which through various combinations of positive and negative readings, will not only indicate whether there is a stalled or jammed package at such point, but also whether a tilted or turned-over package is passing such point. In other words, if a package is moving on its side, rather than on its top or bottom, it will present a lower height profile resulting in a positive reading of the two lower members, but a negative reading in the two higher members of infeed sensor means 240. Generally, it is not desired for such tilted or "knocked-over" packages to enter accumulator 212, and such an infeed sensor means advantageously detects all such conditions to permit signalling for operator intervention or assistance.

Lastly to be described with respect to exemplary structural apparatus is the present locator means 242, which in the preferred illustrated embodiment may be controllably placed vertically in or out of the flow of products along conveyor belt means 210, as represented by the double-headed vertical arrow 244. In essence, such mechanism 242 may be retractable into a protective housing 246 (see also housing 36 and its related discussion in present FIG. 1). Virtually any direction or type of movement may be utilized, but an air-cylinder movement with controllable mechanism 248 (diagrammatically represented) is one preferred form of such aspect of the invention.

Figure 6:
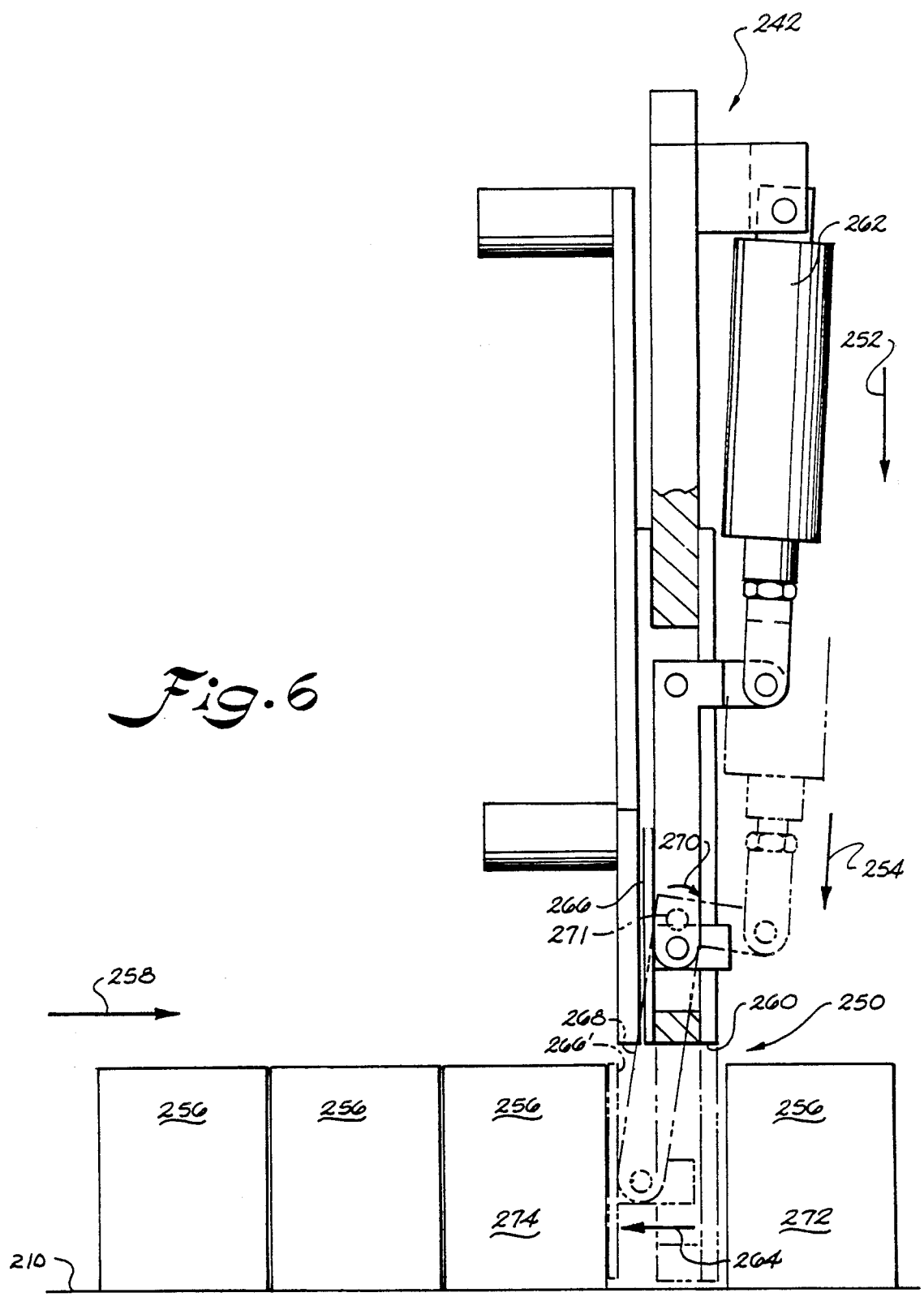
FIG. 6 is an enlarged, generally side plan view of movable locator means, and back-up means in accordance with the present invention.

FIG. 6 herewith illustrates an additional feature of the present invention, which may in a preferred embodiment be integrally incorporated into, or at least supported and carried on such locator mechanism means 242. Such further feature relates to a back-up mechanism or means, generally 250, which permits urging of products backwards (i.e., forced relatively upstream) against the normal flow along product line 210, as discussed hereinafter.

As represented in the side, partially cut-away view, of present FIG. 6, the entire mechanism 242 may be extended in the direction of arrows 252 and 254 so as to block the flow path of products 256 normally moving in the direction of arrow 258 along production line 210. Such extended position is represented generally in the dotted line illustrations of present FIG. 6. The solid line illustrations thereof represent a retracted position, in which the lowermost edge 260 of locator mechanism 242 is above the top of packages of 256, so as to in no way interfere with movement thereof otherwise occurring relative conveyor means 210. However, once engaged in the extended position, controlled actuation of an air cylinder means or equivalent actuation mechanism 262 results, through various linkages, in the "backwards" or upstream movement (direction of arrow 264) of engagement member 266' (dotted line). Since engagement member 266 is, in the extended position of locator mechanism 242, in contact with the downstream side of a package 256, such package and any packages upstream therefrom are pushed or forced in a relatively upstream direction. Such action is particularly advantageous in the context of the present invention, in that it permits such package or packages contacting engagement member 266 or forced upstream thereby to be re-clamped by outfeed brake means 234, for purposes discussed hereinafter. Without reducing the clarity of present FIG. 6 through the addition of numerous reference numerals, those of ordinary skill in the art will appreciate that proper actuation of air cylinder means or equivalent drive means 262 results in pivoting of linkage member 268 in the direction of arrow 270 about axis 271, resulting in the above-discussed movement of engagement member 266 in the direction of arrow 264.

With reference particularly to present FIGS. 5 and 6, the following description outlines certain preferred operational sequences of the present invention, but not necessarily all aspects thereof, nor the only preferred embodiment thereof.

During normal running operations, there is typically a relatively smooth (i.e., unjammed) flow of products or packages from relative upstream workstation 214, along conveyor belt means 210, to relative downstream workstation 216, without any excessive build-up or queuing of packages between such two workstations. During such normal running operations, control means within housing 38, or equivalents thereof, causes selected and controlled actuation and de-actuation of outfeed brake means 234, so that products are selectively held back from emerging from the downstream end of accumulator device 212 until a predetermined number of previously released products reach or clear downstream sensor means 236. Once a previously released package or group of packages (numbering such as 3) passes downstream sensor means 236, then outfeed brake means 234 is de-actuated to permit movement of ordinarily continuously moving conveyor belt means 210 to advance such additional packages downstream.

It should be apparent to those of ordinary skill in the art that if proper signals are not received from downstream sensor means 236, it can be determined that previously released packages have not yet cleared such point, which would indicate either a relatively slow movement of products along production line 210 (regardless of the actual speed of the conveyor belt means itself), or indicate that a jam or blockage has occurred, for whatever reason (for example, due to slow operation of the straw-applicator, or a breakdown thereof).

Preferably, so long as previously released package(s) have not cleared downstream sensor means 236, packages held by outfeed brake means 234 continue to be held because the predetermined minimum distance gap "A" has not yet occurred. Depending on the particular sequence of occurrences, if outfeed brake means 234 has been holding, and subsequently infeed sensor means 240 indicates a jam, it may be assumed that a line of products have queued up along conveyor belt means 210 within apparatus 212, between the infeed end and outfeed end thereof. Once such occurs, in accordance with practice of the present invention generally, a product removal sequence is initiated. In other words, present apparatus switches from a normal run mode into a product removal mode, whereby mechanism 212 (see also mechanism 16 of present FIG. 2) is actuated for removing a queued line or slug of products from conveyor belt means 210. Such removal sequence may be accomplished in various manners in accordance with the present invention, with the following comprising one exemplary embodiment thereof.

During such exemplary product removal sequence, the queued products are permitted to shift slightly downstream, which typically would involve de-actuation of outfeed brake means 234, so that potential shear point or region 230 clears the downstream edge 226 of vein 225. Preferably, de-actuation of brake means 234 is preceded by placement of a locator mechanism, such as that represented by exemplary locator means 242, within the product flow relatively just downstream from the outfeed end of apparatus 212. Such operations result in a relatively slight downward shift of the entire product queue within mechanism 212. At some point during the product removal sequence, preferably infeed brake means 232 is actuated so as to isolate from production line pressure the queued up line of products or packages to be removed from conveyor belt means 210. Also, in embodiments which incorporate the present exemplary movable transfer plate 50 features, such movable plate would be manipulated into position for removal movement of packages relative the conveyor belt means 210 (i.e., moved into the position represented by present FIG. 4).

The foregoing stop and shift operations results in the above-mentioned isolation of the products to be removed (i.e., accumulated). When integrally performed in the overall methodology described above, i.e. when used in combination with maintenance of a gap "A" between apparatus 212 and downstream packages, the potential problem of a nearby or adjacent package 272 (present FIG. 6) can be avoided so that movable locator mechanism or means 242 will not damage or encounter any packages during its operations. Otherwise, mechanism 242 might lower into a package, which would clearly result in its crushing, and its possible release of contents. Such condition, or even the prospect of such occurrence, could be highly undesirable in the event that aseptic packages are being handled. Of course, such occurrences would be undesirable even if aseptic packages were not involved.

Further in accordance with certain aspects of the present invention, after apparatus 212 has been properly indexed or controlled for removing a line of queued up products or packages, backup means 250 may be actuated so that the downstream or leading edge package 274 in actual contact with engagement member 266 may be pushed sufficiently backwards against the flow 258 of conveyor belt means 210, so that it may be re-clamped by outfeed brake means 234. Thereafter, movable locator means 242 (preferably supporting and carrying backup means 250 thereon) may be removed from the normal product flow (i.e., returned to its solid line position as represented in present FIG. 6). The advantage of such operations is that a subsequent relative downstream shift may be effected, so that subsequent product removal sequences may advantageously isolate the queued up products from production line pressures, resulting in the improved and beneficial operations discussed above.

Once a product removal sequence is completed, it should be apparent to those of ordinary skill in the art that the infeed brake means may be de-actuated, and so-called normal run operations resumed until a predetermined excess product queue once again occurs. It should be further apparent to those of ordinary skill in the art that product return sequences may be alternately performed with the present structure, utilizing various methodologies in accordance with this invention. For example, infeed brake means 232 may be actuated so as to permit the return of packages from apparatus 212, whereby slugs or lines of previously removed or accumulated packages may be returned to conveyor belt means 210. When present and used, the movable transfer plate 50 is preferably moved into its position illustrated in present FIG. 3, so as to prevent the lateral shearing of package of product edges on conveyor means 210 during such return operations. Other return sequence variations may be practiced, including variously incorporating alternative use of the above-mentioned movable locator means, and back-up means.

Those of ordinary skill in the art should appreciate that numerous variations and modifications may be made to the foregoing exemplary embodiments and methodologies, without departing from the spirit and scope of the present invention. For example, locator mechanisms may be used which are movable in and out of a product flow without necessarily being retractable in a vertical plane as is the presently illustrated exemplary embodiment. Likewise, actuation for drive members other than the several air cylinders shown herewith may be practiced, such as electrical/servo controls, hydraulic systems, or other actuating or drive mechanisms. Similarly, the number of packages controllably released so as to emerge in groups from the outfeed end of apparatus 212, may be varied. Similarly, the number of packages remaining (after a removal sequence) between the outfeed end 226 of vein 225 and the extended locator mechanism 242, may be varied. For present exemplary purposes only, FIG. 5 illustrates such number of packages as being three. In other words, 27 packages are illustrated as being "stopped" during a product removal sequence, and 24 of such packages are actually removed.

Other variations and specifics of particular embodiments are subject to selection by given users of the invention. For example, apparatus in accordance with this invention may be provided substantially in stainless steel or equivalent materials to permit sterile or other wash-down uses. Also, different sized vertical conveyor mechanisms may be used to achieve different volume capacities, such as twenty or thirty minutes of accumulations of a filler machine output, while requiring a minimum of production line space.

It is further to be understood by those of ordinary skill in the art that the present exemplary description is intended by way of example only, and for present illustrative purposes only, and is not intended as limiting the present invention, which is further set forth in the appended claims.

I claim:

1. A method of surge control for products being transported via a moving conveyor belt means between two production areas, said method comprising:
   providing an accumulator device alongside the conveyor belt means intermediate the two production areas so that one of such areas is upstream of the accumulator device and the other production area is downstream of such device, such device being capable of controllably removing products from the conveyor belt means if there is a back-up of products being fed to the downstream production area;
   selectively holding back all products emerging from the downstream end of the accumulator device during normal running operations so as to maintain a predetermined distance gap between each predetermined number of products moving towards the downstream production area from said accumulator device downstream end, by ensuring the presence of said predetermined distance gap before the release of a subsequent said predetermined number of products; and
   controllably removing products from the conveyor belt means with the accumulator device if a predetermined queue of products develops within the accumulator device before the predetermined distance gap occurs between products emerging from said accumulator device downstream end.

2. A method as in claim 1, wherein said removing step includes holding back products from entering the upstream end of the accumulator device, whereby products to be removed from the conveyor belt means are isolated from production line pressure so as to permit handling of crushable products within the accumulator device without damage to such products.

3. A method as in claim 1, wherein said accumulator device includes a generally vertical conveyor mechanism with a plurality of spaced, outwardly extending veins thereon for the accumulation of products between adjacent such veins, said removing step includes indexing such vertical conveyor mechanism so as to remove from the conveyor belt means a line of products queue within the accumulator device, and said predetermined queue comprises a slug of products extending along the length of the entire vertical conveyor mechanism.

4. A method as in claim 1, further including the step of selectively returning products to the conveyor belt means which were previously removed therefrom with the accumulator device, whenever no products are within such accumulator device on the conveyor belt means.

5. A method as in claim 1, wherein the providing step includes arranging the accumulator device relative the conveyor belt means such that products normally flow through the accumulator device as the conveyor belt means moves.

6. A method as in claim 1, further including the step of permitting products to pass unaffected through the accumulator device along the moving conveyor belt means, whenever the accumulator device is switched off or not properly functioning.

7. A method as in claim 1, further including controllably braking selected products being otherwise advanced towards the downstream production area by the moving conveyor belt means, as a method of controlling the position of products relative to accumulator device.

8. A method as in claim 1, wherein said holding back step includes sensing the progress of products along the moving conveyor belt means at a sensing point located downstream from the downstream edge of the accumulator device at a distance corresponding with the predetermined gap.

9. A method as in claim 1, wherein the products comprise aseptic paper packages, the upstream production area includes package filling operations, and the downstream production area includes packing operations.

10. A method as in claim 2, wherein said predetermined number of products is 3.

11. A method of surge control for products being transported via a moving conveyor belt means between two production areas, said method comprising:
   providing an accumulator device alongside the conveyor belt means intermediate the two production areas so that one of such areas is upstream of the accumulator device and the other production area is downstream of such device, such device being capable of controllably removing products from the conveyor belt means if there is a back-up of products being fed to the downstream production area;

selectively holding back products emerging from the downstream end of the accumulator device so as to maintain a predetermined distance gap between adjacent products moving towards the downstream production area; and controllably removing products from the conveyor belt means with the accumulator device if a predetermined queue of products develops within the accumulator device before the predetermined distance gap occurs between products emerging from the accumulator device; wherein said accumulator device includes a generally vertical conveyor mechanism with a plurality of spaced, outwardly extending veins thereon for the accumulation of products between adjacent such veins, said removing step includes indexing such vertical conveyor mechanism so as to remove from the conveyor belt means a line of products queued within the accumulator device, and said predetermined queue comprises a slug of products extending along the length of the entire vertical conveyor mechanism; and wherein said accumulator device further includes a movable transfer plate operatively situated relative the conveyor belt means and the distal ends of the accumulator device outwardly extending veins, and wherein the position of the movable transfer plate is controlled during the removing of products from the conveyor belt means so as to prevent the occurrence of lateral shear points for such products as they are so removed.

12. A method as in claim 11, further including the step of selectively returning products to the conveyor belt means which were previously removed therefrom with the accumulator device, such returning including controlling the position of the movable transfer plate so as to prevent a shear point for such products as they return to the conveyor belt means.

13. A method as in claim 12, wherein the movable transfer plate has a transfer edge generally adjacent the conveyor belt means, and a secondary edge generally opposite such transfer edge, and wherein such returning includes controlling the position of both such transfer and secondary edges so as to prevent product shear points during their movement relative to the conveyor belt means.

14. A method as in claim 11, wherein maintaining a predetermined distance gap between adjacent products includes maintaining such gap between adjacent product groups comprised of a predetermined number of products.

15. A method of surge control for products being transported via a moving conveyor belt means between two production areas, said method comprising:

providing an accumulator device alongside the conveyor belt means intermediate the two production areas so that one of such areas is upstream of the accumulator device and the other production area is downstream of such device, such device being capable of controllably removing products from the conveyor belt means if there is a back-up of products being fed to the downstream production area;

selectively holding back products emerging from the downstream end of the accumulator device so as to maintain a predetermined distance gap between adjacent products moving towards the downstream production area; and controllably removing products from the conveyor belt means with the accumulator device if a predetermined queue of products develops within the accumulator device before the predetermined distance gap occurs between products emerging from the accumulator device; wherein said accumulator device includes a generally vertical conveyor mechanism with a plurality of spaced, outwardly extending veins thereon for the accumulation of products between adjacent such veins, said removing step includes indexing such vertical conveyor mechanism so as to remove from the conveyor belt means a line of products queued within the accumulator device, and said predetermined queue comprises a slug of products extending along the length of the entire vertical conveyor mechanism;

wherein said accumulator device further includes a locator mechanism, relatively just downstream from the downstream edges of the plurality of outwardly extending veins, and against which products queued within the accumulator device are permitted to shift relatively downstream during the removing step, whereby a product shear point is prevented at the downstream edges of the veins during the removing step.

16. A method as in claim 15, wherein at least one product immediately adjacent said locator mechanism is retained on the conveyor belt means during the removing step, and thereafter such retained product is moved relatively upstream so as to re-establish the predetermined distance gap to be maintained, which gap is diminished whenever products are initially permitted to shift downstream against the locator mechanism.

17. A method as in claim 15, wherein maintaining a predetermined distance gap between adjacent products includes maintaining such gap between adjacent product groups comprised of a predetermined number of products.

18. A method of operating an accumulator device generally of the type having a vertically-oriented conveyor with a plurality of spaced, outwardly extending veins for accumulating products therebetween, with indexing of such conveyor in selected directions resulting alternatively in removal or return of products relative a carrying surface of a production line, said method including:

positioning the accumulator device adjacent a production line of products such that given extending veins may be situated in a null position for the passage of products therethrough with such veins acting as guide rails;

providing a movable transfer plate generally opposite the distal edges of the extending veins in the vicinity of the production line, and having a transfer edge situated generally laterally from the carrying surface of the production line; and alternately lowering the transfer edge beneath the production line carrying surface whenever indexing the vertically-oriented conveyor for removing products from the production line, and raising the transfer edge above the production line carrying surface whenever indexing the vertically-oriented conveyor for returning products to the production line;

whereby edges of the products being handled on the production line are protected from damage due to operation of the accumulator device.

19. A method as in claim 18, wherein the movable transfer plate generally has a curvature which follows that of the pathway for the extending vein distal edges as they are moved in the vicinity of the production line.

20. A method as in claim 18, wherein the movable transfer plate has limited flexibility, and has a transfer plate secondary edge opposite the transfer edge thereof, such secondary edge residing relatively adjacent certain of the vein distal edges, so that alternate lowering and raising of the transfer edge results in corresponding alternate movement of such secondary edge so as to minimize shear point contact of accumulated products with the accumulator device.

21. A method as in claim 20, wherein the transfer plate has slotted openings therein relatively adjacent the secondary edge thereof for guiding movement of the transfer plate.

22. A method as in claim 18, wherein:
said providing step includes providing a pair of controllable pneumatic cylinders operatively associated with respective generally downstream and upstream areas of the transfer plate transfer edge; and
said alternately lowering and raising step includes controllably operating such pneumatic cylinders so as to obtain the desired movement of the transfer plate transfer edge relative the production line carrying surface.

23. A method as in claim 18, further including:
selectively holding back products emerging from the accumulator device so as to maintain a predetermined distance gap between adjacent products moving downstream on the production line from the accumulator device; and
performing the removing of products from the production line whenever a predetermined queue of products develops within the accumulator device before the predetermined distance gap occurs between products emerging from the accumulator device.

24. A method as in claim 23, further including:
temporarily holding back further products from entering the accumulator device whenever such device is either removing or returning products relative the production line; and
prior to removing a queued line of products from the production line, slightly shifting such queued line relatively downstream to prevent the existence of an adjacent product shear point at the downstream edges of the extending veins operatively associated with removal of such products.

25. A method of controlling the flow of products advancing along a conveyor from a first workstation to a second workstation, including the temporary accumulation off-line of excessive numbers of such products queued up between the two workstations, such method including:
providing an apparatus adjacent the conveyor between the two workstations, and having accumulator means for selectively alternately removing and returning groups of products relative such conveyor, such apparatus having an infeed side receiving products from the first workstation upstream therefrom, and an outfeed side from which products emerge on their way to the second workstation downstream therefrom, said accumulator means being situated generally between such apparatus infeed and outfeed sides;
preventing all products from leaving the apparatus outfeed side during normal running operations until each predetermined number of products previously released therefrom have passed a sensing point along the conveyor a predetermined distance downstream towards the second workstation from the apparatus, so as to maintain a predetermined distance gap between each predetermined number of products emerging from the apparatus outfeed side, by ensuring the presence of said predetermined distance gap before the release of a subsequent said predetermined number of products; and
initiating a product removal sequence if the preventing step results in a queue of products extending through the apparatus from the outfeed side thereof back to the infeed side thereof;
wherein such product removal sequence includes stopping the flow of further products into the apparatus infeed side; relatively shifting slightly downstream the products within the apparatus queue; and thereafter operating the accumulator means for removing products from the conveyor within the apparatus, whereby such products are isolated from line pressure along the conveyor such stopping and shifting steps, to prevent shear point damage thereto during their removal.

26. A method as in claim 25, further including returning to the conveyor products previously removed therefrom whenever there are no products between the infeed and outfeed sides of the apparatus.

27. A method as in claim 25, wherein the accumulator means includes a generally vertical escalator-type device having a traveling belt with a plurality of outwardly extending members thereon forming flights, between which groups of products may be located and accumulated off-line of the conveyor, and wherein said apparatus further includes respective infeed brake means and outfeed brake means, for selectively stopping the flow of products at the infeed and outfeed sides, respectively, of the apparatus.

28. A method as in claim 25, wherein the products comprise aseptic paper containers, the first workstation comprises a filler machine, and the second workstation comprises one of a straw-applicator and a packing machine, and wherein the preventing step includes releasing products in groups of a predetermined number.

29. A method as in claim 25, wherein said predetermined number of products is 3.

30. A method of controlling the flow of products advancing along a conveyor from a first workstation to a second workstation, including the temporary accumulation off-line of excessive numbers of such products queued up between the two workstations, such method including:
providing an apparatus adjacent the conveyor between the two workstations, and having accumulator means for selectively alternately removing and returning groups of products relative such conveyor, such apparatus having an infeed side receiving products from the first workstation upstream therefrom, and an outfeed side from which products emerge on their way to the second workstation downstream therefrom, said accumulator means being situated generally between such apparatus infeed and outfeed sides;

preventing products from leaving the apparatus outfeed side until products previously released therefrom have passed a sensing point along the conveyor a predetermined distance downstream towards the second workstation from the apparatus, so as to maintain a predetermined gap between initiating a product removal sequence if the preventing step results in a queue of products extending through the apparatus from the outfeed side thereof back to the infeed side thereof;

wherein such product removal sequence includes stopping the flow of further products into the apparatus infeed side; relatively shifting slightly downstream the products within the apparatus queue; and thereafter operating the accumulator means for removing products from the conveyor within the apparatus, whereby such products are isolated from line pressure along the conveyor by such stopping and shifting steps, to prevent shear point damage thereto during their removal;

wherein the accumulator means includes a generally vertical escalator-type device having a traveling belt with a plurality of outwardly extending members thereon forming flights, between which groups of products may be located and accumulated off-line of the conveyor, and wherein said apparatus further includes respective infeed brake means and outfeed brake means, for selectively stopping the flow of products at the infeed and outfeed sides, respectively, of the apparatus; and wherein the shifting step includes situating a locator member in the flow path of products along the conveyor at a point just downstream from the outfeed brake means, and thereafter releasing the outfeed brake means to permit the queue of products extending through the apparatus to shift downward into engagement with such locator member, whereby at least one of such products is shifted downstream beyond the accumulator means so that products upstream thereof may be cleanly removed from the conveyor without damage to the products.

31. A method as in claim 30, wherein subsequent to removal of products from the conveyor, the at least one product shifted downstream beyond the accumulator means is re-located upstream from the locator member, and thereafter re-clamped with the outfeed brake means, further whereafter the locator member is removed from the product flow path along the conveyor until a subsequent product removal sequence is initiated, whereby such upstream re-locating and re-clamping steps permit a subsequent downstream shifting step to be performed for subsequent product removal sequences.

32. A method of controlling the flow of products advancing along a conveyor from a first workstation to a second workstation, including the temporary accumulation off-line of excessive numbers of such products queued up between the two workstations, such method including:

providing an apparatus adjacent the conveyor between the two workstations, and having accumulator means for selectively alternately removing and returning groups of products relative such conveyor, such apparatus having an infeed side receiving products from the first workstation upstream therefrom, and an outfeed side from which products emerge on their way to the second workstation downstream therefrom, said accumulator means being situated generally between such apparatus infeed and outfeed sides;

preventing products from leaving the apparatus outfeed side until products previously released therefrom have passed a sensing point along the conveyor a predetermined distance downstream towards the second workstation from the apparatus, so as to maintain a predetermined gap between products emerging from the apparatus outfeed side; and initiating a product removal sequence if the preventing step results in a queue of products extending through the apparatus from the outfeed side thereof back to the infeed side thereof;

wherein such product removal sequence includes stopping the flow of further products into the apparatus infeed side; relatively shifting slightly downstream the products within the apparatus queue; and thereafter operating the accumulator means for removing products from the conveyor within the apparatus, whereby such products are isolated from line pressure along the conveyor by such stopping and shifting steps, to prevent shear point damage thereto during their removal;

wherein the accumulator means includes a generally vertical escalator-type device having a traveling belt with a plurality of outwardly extending members thereon forming flights, between which groups of products may be located and accumulated off-line of the conveyor, and wherein said apparatus further includes respective infeed brake means and outfeed brake means, for selectively stopping the flow of products at the infeed and outfeed sides, respectively, of the apparatus; and wherein said method further includes providing the apparatus with a movable transfer plate generally opposite certain of the distal edges of the outwardly extending members of the accumulator means, and having a transfer edge situated generally laterally from the carrying surface of the conveyor; and alternately lowering such transfer edge beneath the conveyor carrying surface whenever removing products from the conveyor, and raising the transfer edge above the conveyor carrying surface whenever returning products to the conveyor;

whereby edges of the products being handled on the conveyor are protected from damage due to operation of the accumulator means.

33. Apparatus for surge control of products being transported via a moving conveyor belt means between two production areas, said apparatus comprising:

accumulator means for being positioned alongside a conveyor belt means intermediate two production areas so as to be upstream and downstream respectively of such areas, said accumulator means controllably removing products from the conveyor belt means, and having a relative infeed side and outfeed side;

outfeed brake means, associated with said accumulator means outfeed side, for controllably holding back products emerging from said accumulator device outfeed side; and control means, operatively associated with said accumulator means and said outfeed brake means, respectively, for actuating said outfeed brake means to hold back all products emerging from said accumulator means during normal running operations so as to maintain a predetermined distance gap between each predetermined number of products moving towards the downstream production area by ensuring the presence of said predetermined distance gap before the release of a subsequent said predetermined number of products, and for controlling said accumulator means to remove products from the conveyor belt means if a predetermined queue of products develops within the accumulator means before said outfeed back means is de-actuated.

34. Apparatus as in claim 33, further including infeed brake means, associated with said accumulator means infeed side, for controllably holding back products from entering the infeed side of said accumulator means during product removing operations of said accumulator means, whereby products to be removed from the conveyor belt means are isolated from production line pressure.

35. Apparatus as in claim 33, wherein said accumulator means includes a generally vertical conveyor mechanism with a plurality of spaced, outwardly extending veins thereon for the accumulation of products between adjacent such veins, wherein indexing of such vertical conveyor mechanism removes a queued line of products situated on the conveyor belt means within the accumulator means, with reversing of such indexing returning such products to the conveyor belt means, and further wherein said predetermined queue of products comprises a slug of products extending along the accumulator means from its outfeed side back to its infeed side.

36. Apparatus as in claim 35, including means for positioning said vertical conveyor mechanism so that a given pair of spaced veins thereof reside on respective lateral sides of the conveyor belt means to function as guide rails for products being conveyed thereby, so that presence of said apparatus along the conveyor belt means will not adversely affect the flow of products therealong if such apparatus is shut down when not properly functioning.

37. Apparatus as in claim 33, further including:
downstream sensor means, located along the conveyor belt means at a predetermined distance downstream from said accumulator means, for sensing the passage of products thereby; and
wherein said control means is responsive to the output of said downstream sensor means for de-actuating said outfeed brake means to release said each predetermined number of products for emerging from said accumulator means after the passage of said predetermined number of previously released products past said downstream sensor means.

38. Apparatus as in claim 33, wherein said predetermined number of products is 3.

39. Apparatus for surge control of products being transported via a moving conveyor belt means between two production areas, said apparatus comprising:
accumulator means for being positioned alongside a conveyor belt means intermediate two production areas so as to be upstream and downstream respectively of such areas, said accumulator means controllably removing products from the conveyor belt means, and having a relative infeed side and outfeed side;
outfeed brake means, associated with said accumulator means outfeed side, for controllably holding back products emerging from, said accumulator device outfeed side; and
control means, operatively associated with said accumulator means and said outfeed brake means, respectively, for actuating said outfeed brake means to hold back products emerging from said accumulator means so as to maintain a predetermined distance gap between adjacent products moving towards the downstream production area, and for controlling said accumulator means to remove products from the conveyor belt means if a predetermined queue of products develops within the accumulator means before said outfeed brake means is de-actuated; wherein
said accumulator means includes a generally vertical conveyor mechanism with a plurality of spaced, outwardly extending veins thereon for the accumulation of products between adjacent such veins, wherein indexing of such vertical conveyor mechanism removes a queued line of products situated on the conveyor belt means within the accumulator means, with reversing of such indexing returning such products to the conveyor belt means, and further wherein said predetermined queue of products comprises a slug of products extending along the accumulator means from its outfeed side back to its infeed side; and wherein said apparatus further includes
a movable transfer plate operatively situated relative the conveyor belt means and the distal ends of said accumulator means outwardly extending veins; and
means for controlling the position of said movable transfer plate relative the conveyor belt means during either the removing or returning of products relative such conveyor belt means so as to prevent the occurrence of lateral shear points for such products.

40. Apparatus as in claim 39, wherein maintaining a predetermined distance gap between adjacent products includes maintaining such gap between adjacent product groups comprised of a predetermined number of products.

41. Apparatus for surge control of products being transported via a moving conveyor belt means between two production areas, said apparatus comprising:
accumulator means for being positioned alongside a conveyor belt means intermediate two production areas so as to be upstream and downstream respectively of such areas, said accumulator means controllably removing products from the conveyor belt means, and having a relative infeed side and outfeed side;
outfeed brake means, associated with said accumulator means outfeed side, for controllably holding back products emerging from said accumulator device outfeed side; and
control means, operatively associated with said accumulator means and said outfeed brake means, respectively, for actuating said outfeed brake means to hold back products emerging from said accumulator means so as to maintain a predetermined distance gap between adjacent products moving towards the downstream production area, and for controlling said accumulator means to remove products from the conveyor belt means if a predetermined queue of products develops within the accumulator means before said outfeed brake means is de-actuated; wherein said accumulator means includes a generally vertical conveyor mechanism with a plurality of spaced, outwardly extending veins thereon for the accumulation of products between adjacent such veins, wherein indexing of such vertical conveyor mechanism removes a queued line of products situated on the conveyor belt means within the accumulator means, with reversing of such indexing returning such products to the conveyor belt means, and further wherein said predetermined queue of products comprises a slug of products extending along the accumulator means from its outfeed side back to its infeed side; and wherein said apparatus further includes downstream locator means, for establishing a stop point relatively just downstream from said accumulator means outfeed side, against which queued products are shifted relatively downstream just prior to removal of products from the conveyor belt means, whereby adjacent product shear point interaction with a vertical conveyor mechanism vein is prevented.

42. Apparatus as in claim 41, wherein said downstream locator means further includes back-up means for selectively forcing relatively upstream certain of the products stopped by said downstream locator means, so as to be re-clamped by said outfeed brake means.

43. Apparatus as in claim 41, wherein maintaining a predetermined distance gap between adjacent products includes maintaining such gap between adjacent product groups comprised of a predetermined number of products.

44. An improved accumulator device generally of the type having a vertically-oriented conveyor with a plurality of spaced, outwardly extending veins for accumulating products therebetween, with indexing of such conveyor in selected directions resulting alternatively in removal or return of products relative a carrying surface of a production line with which such accumulator device is associated in such fashion that given of the extending veins may be situated in a null position for the passage of products therethrough carried on the conveyor with such veins acting as guide rails, said improved accumulator device including a movable transfer plate generally opposite the distal edges of the extending veins in the vicinity of the production line, and having a transfer edge situated generally laterally from the carrying surface of the production line;.and means for controllably moving said movable transfer plate so as to lower said transfer edge thereof beneath the production line carrying surface whenever the conveyor is being indexed for the removal of products from the production line, and so as to raise said transfer edge above the production line carrying surface whenever the conveyor is being indexed for the return of products to the production line, whereby edges of products being handled on the production line are protected from damage due to operation of the vertically-oriented conveyor.

45. An improved accumulator device as in claim 44, wherein said movable transfer plate is generally curved, so as to reside generally opposite the extending vein distal edges as same are moved in the vicinity of the production line.

46. An improved accumulator device as in claim 44, wherein said movable transfer plate includes a secondary edge thereof situated generally opposite said transfer edge thereof, said secondary edge residing relatively adjacent certain of the vein distal edges, and being moved during operation of said means for moving said movable transfer plate, so as to minimize shear point contact of accumulated products with the accumulator device.

47. An improved accumulator device as in claim 46, wherein said transfer plate includes slotted openings therein relatively adjacent said secondary edge, for cooperating with guide members of the accumulator device for guided movement of said transfer plate.

48. An improved accumulator device as in claim 44, wherein said means for moving said movable transfer plate comprise a pair of controllable pneumatic cylinders operatively associated with respective generally downstream and upstream areas of said transfer plate transfer edge.

49. An improved accumulator device as in claim 44, further including:

downstream sensor means located along the production line a predetermined distance downstream from an outfeed end of said vertically-oriented conveyor, for sensing the presence of products on such production line at such point;

infeed sensor means located along the production line adjacent the infeed end of said vertically-oriented conveyor, for detecting the presence of products on such production line at such point;

outfeed brake means for selectively stopping the flow of products along the production line at an outfeed end of said vertically-oriented conveyor; and control means, responsive to said downstream sensor means and infeed sensor means, for controlling said outfeed brake means, said vertically-oriented conveyor, and said means for moving said movable transfer plate, so as to hold back products emerging from said accumulator device to thereby maintain a predetermined distance gap between adjacent products moving downstream on the production line from such accumulator device, and for removing products from the production line whenever a predetermined queue of products develops within said accumulator device before said predetermined distance gap occurs between products emerging from said accumulator device.

50. An improved accumulator device as in claim 49, further including:

infeed brake means situated along the production line adjacent the infeed end of said vertically-oriented conveyor, for controllably stopping the flow of products along such production line at such point; and locator means, controllably movable into a position just downstream from the outfeed end of said vertically-oriented conveyor, for interrupting the flow of products along the production line at such point; and wherein said control means further functions during removing of products to actuate said infeed brake means for temporarily holding back further products from entering said accumulator device, and to situate said locator means in the flow path of products along the production line and thereafter de-actuate said outfeed brake means to permit a queued line of products within said accumulator device to slightly shift relatively downstream, thereby preventing the occurrence of an adjacent product shear point at the downstream edges of the extending veins of said vertically-oriented conveyor.

51. An improved accumulator device as in claim 50, further including back-up means carried on said locator means, and actuated by said control means subsequent to the removing of products from the production line within the accumulator device, for forcing slightly upstream products located between said locator means and the outfeed end of said accumulator device, so such forced products may be re-clamped by said outfeed brake means, whereby subsequent relatively downstream shifting of a subsequently queued line of products may be performed.

52. An improved accumulator device as in claim 49, wherein maintaining a predetermined distance gap between adjacent products includes maintaining such gap between adjacent product groups comprised of a predetermined number of products.

53. Product handling apparatus for controlling the flow of products advancing along a conveyor from a first workstation to a second workstation, said apparatus including:
  accumulator means, adjacent the conveyor between the first and second workstations, for controllably alternately removing and returning products relative the conveyor, said accumulator means having respective infeed and outfeed sides generally between which products may be removed from the conveyor;
  infeed brake means, associated with said accumulator means infeed side, for being controllably actuated for stopping the entry of products along the conveyor into said accumulator means infeed side;
  outfeed brake means, associated with said accumulator means outfeed side, for being controllably actuated for stopping products along the conveyor from emerging from said accumulator means outfeed side;
  downstream sensor means, situated alongside the conveyor a predetermined distance downstream from said accumulator means outfeed side, for detecting the passage of products thereby; and
  control means operatively associated with said accumulator means, infeed brake means, outfeed brake means, and downstream sensor means, respectively, for temporarily accumulating products off-line of the conveyor whenever excessive numbers of products queue up between the first and second workstations;
  wherein said control means operates in a normal run mode to alternately actuate and de-actuate said outfeed brake means for preventing all products from leaving said accumulator means outfeed side until a predetermined number of previously released products have passed said sensor means, by ensuring the passage of previously released products passed said sensor means before the release of a subsequent said predetermined number of products, and wherein said control means operates in a product removal mode whenever actuation of said outfeed brake means in the normal run mode results in a queue of products extending through the accumulator means from said outfeed side thereof back to said infeed side thereof;
  and wherein such product removal mode includes actuating said infeed brake means to stop upstream products on the conveyor from entering said accumulator means infeed side, de-actuating said outfeed brake means to permit relative downstream shifting of products on the conveyor within said accumulator means, and controlling said accumulator means for removing such products from the conveyor.

54. Product handling apparatus as in claim 53, wherein said control means functions during the absence of any products on the conveyor within said accumulator means so as to return products to such conveyor which were previously removed therefrom by said accumulator means.

55. Product handling apparatus as in claim 53, wherein the accumulator means includes a vertical conveyor mechanism having a plurality of spaced, outwardly extending flights thereon for the accumulation of products between adjacent of such flights, and wherein products for accumulation therebetween comprise paper-based packages filled with liquid materials, the first workstation comprises a filler machine, and the second workstation comprises either of a straw-applicator or packing machine.

56. Product handling apparatus as in claim 53, wherein said predetermined number of products is 3.

57. Product handling apparatus for controlling the flow of products advancing along a conveyor from a first workstation to a second workstation, said apparatus including:
  accumulator means, adjacent the conveyor between the first and second workstations, for controllably alternately removing and returning products relative the conveyor, said accumulator means having respective infeed and outfeed sides generally between which products may be removed from the conveyor;
  infeed brake means, associated with said accumulator means infeed side, for being controllably actuated for stopping the entry of products along the conveyor into said accumulator means infeed side;
  outfeed brake means, associated with said accumulator means outfeed side, for being controllably actuated for stopping products along the conveyor from emerging from said accumulator means outfeed side;
  downstream sensor means, situated alongside the conveyor a predetermined distance downstream from said accumulator means outfeed side, for detecting the passage of products thereby; and
  control means operatively associated with said accumulator means, infeed brake means, outfeed brake means, and downstream sensor means, respectively, for temporarily accumulating products off-line of the conveyor whenever excessive numbers of products queue up between the first and second workstations;
  wherein said control means operates in a normal run mode to alternately actuate and de-actuate said outfeed brake means for preventing products from leaving said accumulator means outfeed side until a predetermined number of previously released products have passed said sensor means, and operates in a product removal mode whenever actuation of said outfeed brake means in the normal run mode results in a queue of products extending through the accumulator means from said outfeed side thereof back to said infeed side thereof;

and wherein such product removal mode includes actuating said infeed brake means to stop upstream products on the conveyor from entering said accumulator means infeed side, de-actuating said outfeed brake means to permit relative downstream shifting of products on the conveyor within said accumulator means, and controlling said accumulator means for removing such products from the conveyor; and wherein said apparatus further includes movable locator means, situated relatively just downstream from said outfeed brake means, and responsive to said control means for stopping the flow of products on the conveyor just downstream from said outfeed brake means whenever said outfeed brake means is de-actuated during said product removal mode functioning of said control means.

58. Product handling apparatus as in claim 57, further including back-up means situated relatively just downstream from said outfeed brake means, for forcing slightly upstream products located against said locator means subsequent to said product removal, to permit re-clamping of such forced products with said outfeed brake means, whereby subsequent relative downstream shifting functions may be practiced for subsequently queued products.

59. A product handling apparatus for controlling the flow of products advancing along a conveyor from a first workstation to a second workstation, said apparatus including:

accumulator means, adjacent the conveyor between the first and second workstations, for controllably alternately removing and returning products relative the conveyor, said accumulator means having respective infeed and outfeed sides generally between which products may be removed from the conveyor;

infeed brake means, associated with said accumulator means infeed side, for being controllably actuated for stopping the entry of products along the conveyor into said accumulator means infeed side;

outfeed brake means, associated with said accumulator means outfeed side, for being controllably actuated for stopping products along the conveyor from emerging from said accumulator means outfeed side;

downstream sensor means, situated alongside the conveyor a predetermined distance downstream from said accumulator means outfeed side, for detecting the passage of products thereby; and control means operatively associated with said accumulator means, infeed brake means, outfeed brake means, and downstream sensor means, respectively, for temporarily accumulating products off-line of the conveyor whenever excessive numbers of products queue up between the first and second workstations;

wherein said control means operates in a normal run mode to alternately actuate and de-actuate said outfeed brake means for preventing products from leaving said accumulator means outfeed side until a predetermined number of previously released products have passed said sensor means, and operates in a product removal mode whenever actuation of said outfeed brake means in the normal run mode results in a queue of products extending through the accumulator means from said outfeed side thereof back to said infeed side thereof;

and wherein such product removal mode includes actuating said infeed brake means to stop upstream products on the conveyor from entering said accumulator means infeed side, de-actuating said outfeed brake means to permit relative downstream shifting of products on the conveyor within said accumulator means, and controlling said accumulator means for removing such products from the conveyor; and further wherein said accumulator means includes a vertically-oriented conveyor mechanism having a plurality of spaced, outwardly extending flights received thereon for the accumulation of products between adjacent of such flights; and wherein said product handling apparatus further includes a movable transfer plate situated generally laterally from the conveyor along which such products advance, generally opposite the distal edges of the accumulator means outwardly extending flights; and further includes means for alternately lowering said transfer plate beneath the conveyor during the removing of products therefrom, and raising the movable transfer plate above the conveyor during the return of products thereto from said accumulator means, whereby edges of such products being handled by the accumulator means are protected from damage due to operation thereof.

60. Product handling apparatus as in claim 59, wherein said movable transfer plate further includes a secondary edge opposite an edge thereof adjacent the conveyor, said secondary edge including guide slots therein cooperating with other support structure of said apparatus, so as to guide movement of such secondary edge during operation of said means for moving said transfer plate so that such secondary edge also prevents the occurrence of shear points between products and said accumulator means.

61. An accumulator for use with packages moving between workstations, such as situated along a conveyor belt moving from a filler machine towards a straw-applicator or packing machine, said accumulator comprising:

respective infeed and outfeed ends situated upstream and downstream, respectively, relative the moving conveyor belt;

a vertically-oriented escalator-type mechanism situated substantially over the conveyor belt, and located generally between said accumulator infeed and outfeed ends, said mechanism having a controllably movable conveyor belt with plural, spaced flights thereon for selectively removing packages from the conveyor belt and returning packages thereto;

an infeed brake associated with said infeed end for controllably stopping the flow of packages along the conveyor belt into said accumulator;

an outfeed brake associated with said outfeed end for controllably stopping the flow of packages along the conveyor belt from said accumulator;

infeed sensor means for detecting the presence of packages at said accumulator infeed end;

outfeed sensor means for detecting the presence of packages at said accumulator outfeed end;

downstream sensor means for detecting the presence of packages on the conveyor belt at a predetermined distance downstream from said accumulator outfeed end;

a controllably movable locator member, situated at a point relatively just downstream from said outfeed brake and said accumulator outfeed end, for selectively interrupting the flow of packages along the conveyor belt at such point;

a back-up mechanism, situated at said point relatively just downstream from said outfeed brake for selectively forcing packages at least slightly back upstream against the conveyor belt so as to be stopped thereat by said outfeed brake; and accumulator control means, responsive to said infeed, outfeed, and downstream sensor means, and controlling said escalator-type mechanism, said infeed and outfeed brakes, said locator member, and said backup mechanism, for selectively removing and returning packages relative the conveyor belt without damage to such packages, so that queued up packages are first isolated from production line pressure and thereafter temporarily accumulated on said escalator-type mechanism for subsequent reinsertion onto the production line.

62. An accumulator as in claim 61, further including:
a curved movable transfer plate having limited flexibility and a transfer edge situated generally laterally from a carrying surface of the moving conveyor belt, said curved transfer plate being situated generally opposite distal edges of said escalator-type mechanism spaced flights, for holding packages into said escalator type mechanism which are situated between adjacent of such flights; and means for controllably moving said transfer plate so that said transfer edge thereof is lowered beneath the moving conveyor belt carrying surface whenever the escalator-type mechanism is indexed for selectively removing packages from the conveyor belt, and for alternately raising said transfer edge above the moving conveyor belt carrying surface whenever said escalator-type mechanism is indexed for returning packages to such conveyor belt;

whereby edges of packages being handled by said escalator-type mechanism are protected from damage due to operation thereof.

63. An accumulator as in claim 61, wherein said accumulator control means functions to initially isolate queued up packages from production line pressure and thereafter temporarily accumulate such isolated packages on said escalator-type mechanism by:

(a) actuating said outfeed brake for stopping the flow of packages thereat until packages previously emerging from said accumulator have passed said downstream sensor means;

(b) sensing the occurrence of a queue-up of packages along said accumulator between said outfeed sensor means and infeed sensor means thereof;

(c) moving said locator member into a position for interrupting the flow of packages along the conveyor belt at said point relatively just downstream from said outfeed brake;

(d) de-actuating said outfeed brake so as to permit the queued-up line of packages to shift relatively downstream and be stopped by said locator member;

(e) indexing said escalator-type mechanism so as to remove said queued-up line of packages residing generally between said outfeed brake and said infeed brake;

(f) operating said back-up mechanism so as to force upstream packages residing against said locator member which were not removed from the conveyor belt by said escalator-type mechanism;

(g) re-actuating said outfeed brake for stopping such forced upstream packages;

(h) removing said locator member from the conveyor belt flow path; and (i) resuming controlled actuation/de-actuation of said outfeed brake responsive to said downstream sensor means so as to release a predetermined number of packages on the moving conveyor belt from said accumulator with a predetermined distance therebetween.

64. An accumulator as in claim 63, wherein said actuating includes stopping the flow of packages until a predetermined number of previously emerging packages have passed said downstream sensor means.

* * * * *

UNITED STATES PATENT AND TRADEMARK OFFICE
CERTIFICATE OF CORRECTION

PATENT NO. : 4,989,718
DATED      : February 5, 1991
INVENTOR(S): Dorian F. Steeber It is certified that error appears in the above-identified patent and that said Letters Patent is hereby corrected as shown below:

Column 22, Claim 25, line 31, insert --by-- after "conveyor."

Column 23, Claim 30, line 10, insert --products emerging from the apparatus outfeed side; and-- after "between."

Signed and Sealed this

First Day of September, 1992

Attest:

DOUGLAS B. COMER

Attesting Officer            Acting Commissioner of Patents and Trademarks

UNITED STATES PATENT AND TRADEMARK OFFICE
CERTIFICATE OF CORRECTION

PATENT NO. : 4,989,718

DATED : February 5, 1991

INVENTOR(S) : Steeber

Page 1 of 2

It is certified that error appears in the above-identified patent and that said Letters Patent is hereby corrected as shown below:

```
Column 4, line 1, change "veins" to --vanes--.
Column 4, line 8, change "veins" to --vanes--.
Column 4, line 9, change "veins" to --vanes--.
Column 4, line 12, change "veins" to --vanes--.
Column 5, line 22, change "veins" to --vanes--.
Column 5, line 28, change "veins" to --vanes--.
Column 5, line 30, change "veins" to --vanes--.
Column 5, line 32, change "veins" to --vanes--.
Column 8, line 6, change "veins" to --vanes--.
Column 13, line 21, change "vein" to --vane--.
Column 13, line 25, change "vein" to --vane--.
Column 13, line 29, change "veins" to --vanes--.
Column 16, line 6, change "vein" to --vane--.
Column 17, line 28, change "vein" to --vane--.
Column 18, line 22, change "veins" to --vanes--.
Column 18, line 23, change "veins" to --vanes--.
Column 19, line 20, change "veins" to --vanes--.
Column 19, line 21, change "veins" to --vanes--.
Column 19, line 32, change "veins" to --vanes--.
Column 20, line 16, change "veins" to --vanes--.
Column 20, line 17, change "veins" to --vanes--.
Column 20, line 28, change "veins" to --vanes--.
Column 20, line 32, change "veins" to --vanes--.
Column 20, line 50, change "veins" to --vanes--.
Column 20, line 57, change "veins" to --vanes--.
Column 20, line 58, change "veins" to --vanes--.
Column 20, line 61, change "veins" to --vanes--.
Column 21, line 10, change "vein" to --vane--.
Column 21, line 16, change "vein" to --vane--.
Column 21, line 57, change "veins" to --vanes--.
```

UNITED STATES PATENT AND TRADEMARK OFFICE
CERTIFICATE OF CORRECTION

PATENT NO. : 4,989,718

DATED : February 5, 1991

INVENTOR(S) : Steeber

It is certified that error appears in the above-identified patent and that said Letters Patent is hereby corrected as shown below:

```
Column 25, line 28, change "veins" to --vanes--.
Column 25, line 29, change "veins" to --vanes--.
Column 25, line 40, change "veins" to --vanes--.
Column 26, line 21, change "veins" to --vanes--.
Column 26, line 22, change "veins" to --vanes--.
Column 26, line 35, change "veins" to --vanes--.
Column 27, line 7, change "veins" to --vanes--.
Column 27, line 8, change "veins" to --vanes--.
Column 27, line 26, change "vein" to --vane--.
Column 27, line 39, change "veins" to --vanes--.
Column 27, line 45, change "veins" to --vanes--.
Column 27, line 47, change "veins" to --vanes--.
Column 27, line 50, change "veins" to --vanes--.
Column 27, line 66, change "vein" to --vane--.
Column 28, line 5, change "vein" to --vane--.
Column 29, line 4, change "veins" to vanes--.
```

Signed and Sealed this

Eighth Day of November, 1994

Attest:

BRUCE LEHMAN

Attesting Officer

Commissioner of Patents and Trademarks